United States Patent
Harms et al.

(10) Patent No.: US 12,103,185 B2
(45) Date of Patent: Oct. 1, 2024

(54) PARAMETERIZED WAYPOINT GENERATION ON DYNAMICALLY PARENTED NON-STATIC OBJECTS FOR ROBOTIC AUTONOMOUS TASKS

(71) Applicant: Samsung Electronics Company, Ltd., Gyeonggi-Do (KR)

(72) Inventors: Brian Harms, San Jose, CA (US); Kathleen Sofia Hajash, San Francisco, CA (US); Philipp Schoessler, Scotts Valley, CA (US); Dane Mason, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 17/198,152

(22) Filed: Mar. 10, 2021

(65) Prior Publication Data
US 2022/0288777 A1    Sep. 15, 2022

(51) Int. Cl.
*B25J 9/16* (2006.01)
*B25J 11/00* (2006.01)

(52) U.S. Cl.
CPC .......... *B25J 9/1664* (2013.01); *B25J 9/1661* (2013.01); *B25J 9/1697* (2013.01); *B25J 11/0045* (2013.01); *G05B 2219/40395* (2013.01); *G05B 2219/40564* (2013.01)

(58) Field of Classification Search
CPC ...... B25J 9/1664; B25J 9/1661; B25J 9/1697; B25J 11/0045; G05B 2219/40395; G05B 2219/40564
See application file for complete search history.

(56) References Cited

U.S. PATENT DOCUMENTS

| | | | |
|---|---|---|---|
| 7,751,938 | B2 | 7/2010 | Tsusaka |
| 8,452,451 | B1 * | 5/2013 | Francis, Jr. ............ B25J 9/1658 |
| | | | 700/258 |
| 8,855,814 | B2 | 10/2014 | Kim |
| 8,972,057 | B1 | 3/2015 | Freeman |
| 2010/0204828 | A1 | 8/2010 | Yoshizawa |

(Continued)

FOREIGN PATENT DOCUMENTS

| | | |
|---|---|---|
| DE | 102006055917 | 6/2008 |
| EP | 3578322 | 11/2019 |

(Continued)

OTHER PUBLICATIONS

Choreograph programming interface by Automata https://automata.tech/programming-eva-choreograph-and-the-api/, Downloaded from web Jan. 25, 2021.

(Continued)

*Primary Examiner* — Abby Y Lin
*Assistant Examiner* — Karston G. Evans

(57) ABSTRACT

In one embodiment, a method includes generating a trajectory plan to complete a task to be executed by a robotic system, identifying objects in the environment required for completing the task, determining attributes for each of the identified objects, determining trajectory-parameters for the trajectory plan based on the determined attributes for each identified object and operational conditions in an environment associated with the robotic system, and executing the task based on the determined trajectory-parameters for the trajectory plan.

20 Claims, 26 Drawing Sheets

(56) References Cited

U.S. PATENT DOCUMENTS

| | | | |
|---|---|---|---|
| 2010/0231506 A1 | 9/2010 | Pryor | |
| 2011/0208355 A1* | 8/2011 | Tsusaka | B25J 13/08 |
| | | | 901/31 |
| 2012/0156362 A1* | 6/2012 | Sadovoy | B05B 12/084 |
| | | | 427/9 |
| 2016/0167228 A1* | 6/2016 | Wellman | B25J 9/1602 |
| | | | 901/3 |
| 2018/0029226 A1 | 2/2018 | Dani | |
| 2018/0290302 A1* | 10/2018 | Wang | B25J 9/1664 |
| 2019/0084158 A1 | 3/2019 | Atherton | |
| 2019/0143512 A1 | 5/2019 | Corkum | |
| 2019/0143517 A1 | 5/2019 | Yang | |
| 2019/0366543 A1 | 12/2019 | Butterfoss | |
| 2019/0381654 A1* | 12/2019 | Oleynik | B25J 9/0081 |
| 2020/0001463 A1 | 1/2020 | Kim | |
| 2020/0086487 A1 | 3/2020 | Johnson | |
| 2020/0130192 A1 | 4/2020 | Ogawa | |
| 2021/0069910 A1* | 3/2021 | Oleynik | F25D 23/028 |
| 2021/0197378 A1 | 7/2021 | Schonherr | |
| 2021/0276188 A1 | 9/2021 | Tang | |
| 2021/0284198 A1 | 9/2021 | Schmidt | |
| 2021/0308865 A1* | 10/2021 | Lin | B25J 9/1651 |
| 2021/0309264 A1 | 10/2021 | Felip Leon | |
| 2021/0387350 A1* | 12/2021 | Oleynik | A47J 44/00 |
| 2022/0032461 A1 | 2/2022 | Gupta | |
| 2022/0250240 A1 | 8/2022 | Gaydarov | |
| 2022/0371195 A1* | 11/2022 | Lee | B25J 13/085 |
| 2023/0032261 A1* | 2/2023 | Nakashima | B25J 9/1656 |
| 2023/0330857 A1* | 10/2023 | Verschueren | B25J 9/1664 |

FOREIGN PATENT DOCUMENTS

| | | |
|---|---|---|
| EP | 3684559 | 7/2020 |
| JP | 2018-158393 A | 10/2018 |
| JP | 2019-123022 A | 7/2019 |
| JP | 6060841 | 8/2019 |
| JP | 2020082217 | 6/2020 |
| JP | 2020097091 | 6/2020 |
| KR | 2011-0015833 A | 2/2011 |
| KR | 20160124770 | 10/2016 |
| KR | 2018-0114698 | 10/2018 |
| WO | WO 2019/029870 | 2/2019 |
| WO | WO 2019/053474 | 3/2019 |
| WO | WO 2020-017092 | 1/2020 |
| WO | WO 2020-075526 A1 | 4/2020 |

OTHER PUBLICATIONS

PCT Search Report in PCT/KR2022/000950, May 10, 2022.
PCT Written Decision in PCT/KR2022/000950, May 10, 2022.
PCT Search Report in PCT/KR2022/003240, Jun. 16, 2022.
PCT Written Decision in PCT/KR2022/003240, Jun. 16, 2022.
PCT Search Report in PCT/KR2022/004300, Jul. 8, 2022.
PCT Written Opinion in PCT/KR2022/004300, Jul. 8, 2022.
Non-final office action in U.S. Appl. No. 17/198,128, Jan. 20, 2023.
Non-final office action in U.S. Appl. No. 17/217,806, Jan. 25, 2023.
Final office action in U.S. Appl. No. 17/217,806, Aug. 10, 2023.
Final office action in U.S. Appl. No. 17/198,128, May 10, 2023.
Notice of Allowance in U.S. Appl. No. 17/217,806, Jun. 30, 2023.
Notice of Allowance in U.S. Appl. No. 17/198,128, Jul. 17, 2023.

* cited by examiner

PARAMETERIZED WAYPOINT GENERATION ON DYNAMICALLY PARENTED NON-STATIC OBJECTS FOR ROBOTIC AUTONOMOUS TASKS

TECHNICAL FIELD

This disclosure relates generally to robotics, and in particular relates to machine-learning for robotics.

BACKGROUND

A robot is a machine, especially one programmable by a computer, capable of carrying out a complex series of actions automatically. Robots may be guided by an external control device or the control may be embedded within. Robots may be constructed on the lines of human form, but most robots are machines designed to perform a task with no regard to their aesthetics. Robots may be autonomous or semi-autonomous and range from humanoids to industrial robots, medical operating robots, patient assist robots, dog therapy robots, collectively programmed swarm robots, UAV drones, and even microscopic nano robots. By mimicking a lifelike appearance or automating movements, a robot may convey a sense of intelligence or thought of its own. Autonomous things may be expected to proliferate in the coming decade, with home robotics and the autonomous car as some of the main drivers.

The branch of technology that deals with the design, construction, operation, and application of robots, as well as computer systems for their control, sensory feedback, and information processing is robotics. These technologies deal with automated machines that can take the place of humans in dangerous environments or manufacturing processes, or resemble humans in appearance, behavior, or cognition. Many of today's robots are inspired by nature contributing to the field of bio-inspired robotics. Robots have replaced humans in performing repetitive and dangerous tasks which humans prefer not to do, or are unable to do because of size limitations, or which take place in extreme environments such as outer space or the bottom of the sea.

DESCRIPTION OF EXAMPLE EMBODIMENTS

Robotic System Overview

Figure 1:
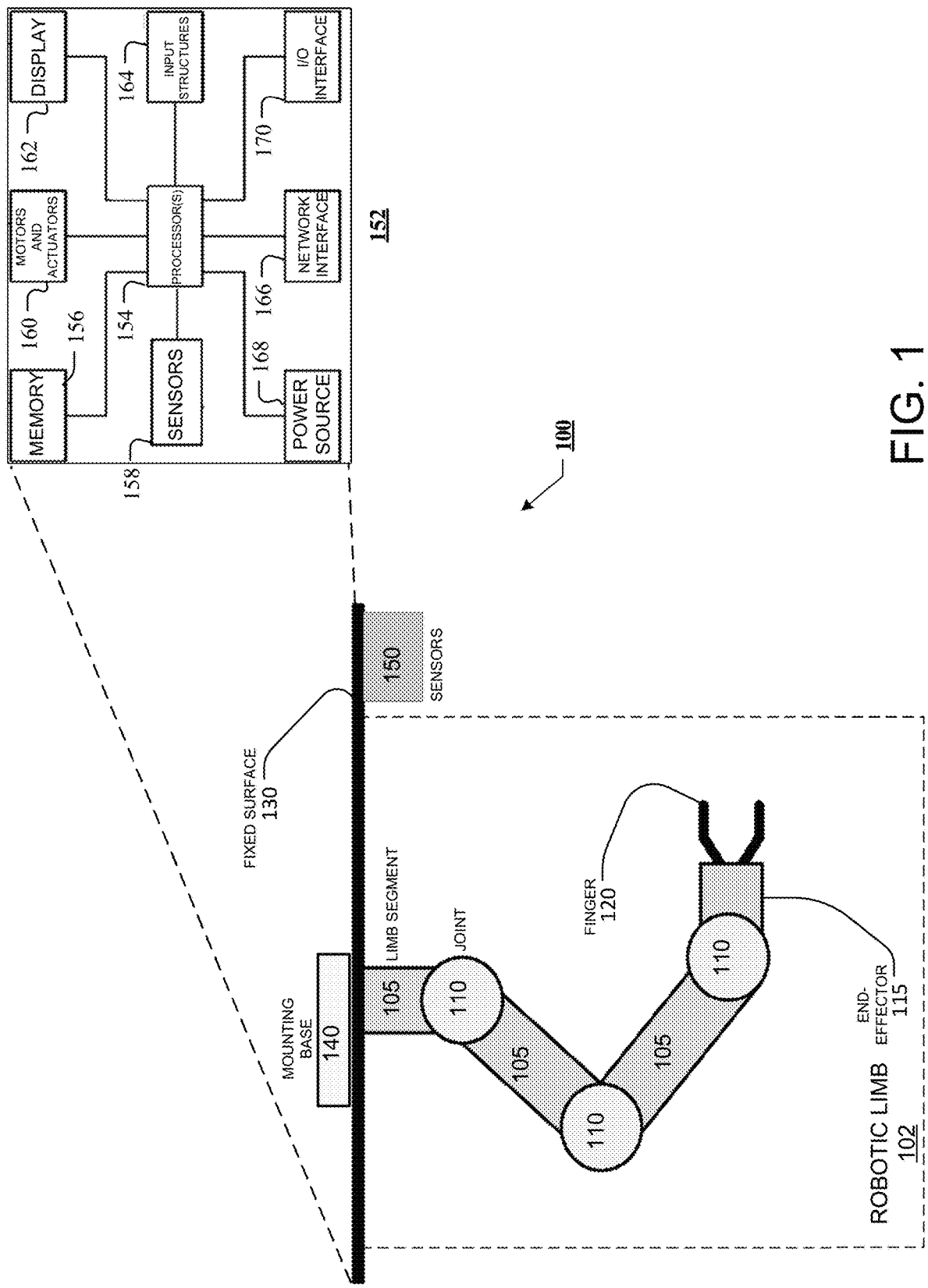
FIG. 1 illustrates an example robotic system chosen below.

This disclosure describes systems and methods that combine lightweight and low-cost components with captured sensor data from one or more sensors, such as image sensors, to increase the accuracy and precision of the robotic system through software. Image sensors are often affordable relative to robotic limb components and can be accurate for measuring distances and poses of objects within their respective fields of view.

In particular embodiments, a robotic system 100 may include a robotic limb that may perform operations to provide services to one or more users in different tasks such as cooking, gardening, painting, etc. Robotic limb 102 may include any suitable combination of one or more limb segment 105, joint 110, and end-effector 115. In some embodiments, robotic limb 102 may further include one or more manipulators. As an example and not by way of limitation, this manipulator may include one or more fingers 120, a suction-based gripper, or a jammable-based gripper. In some embodiments, robotic limb 102 may be connected at one end to a fixed surface 130 via mounting base 140, which may be a low-profile mounting base. In some embodiments, robotic limb 100 may be associated with one or more external sensors 150. As an example and not by way of limitation, this fixed surface may include a wall, a ceiling, a cabinet, a workbench, etc. As further depicted by FIG. 1, the robotic system 100 may include an onboard computing system 152 that may be utilized for the operation of the robotic limb 102, in accordance with the presently disclosed embodiments. The onboard computing system may track multiple components of a robotic limb, such as joints, end-effectors, grippers, fingers, etc., and adjusts their pose accordingly until a desired pose is reached. A pose may include either of, or both of, the position in three-dimensional (3D) space and the orientation of the one or more components of the robotic limb.

For example, in some embodiments, the onboard computing system 152 may include, among other things, one or more processor(s) 154, memory 156, sensors 158, one or more motors and actuators 160, a display 162, input structures 164, network interfaces 166, a power source 168, and an input/output (I/O) interface 170. It should be noted that FIG. 1 is merely one example of a particular implementation and is intended to illustrate the types of components that may be present in the robotic system 100. As depicted, the one or more processor(s) 154 may be operably coupled with the memory 156 to perform various algorithms for instructing the robotic limb 102 to perform different operations. Such programs or instructions executed by the processor(s) 154 may be stored in any suitable article of manufacture that includes one or more tangible, computer-readable media at least collectively storing the instructions or routines, such as the memory 156. The memory 156 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 154 to enable the robotic limb 102 to perform various functionalities.

In certain embodiments, the sensors 158 may include, for example, one or more cameras (e.g., depth cameras), touch sensors, microphones, motion detection sensors, thermal detection sensors, light detection sensors, time of flight (ToF) sensors (e.g., LiDAR system), ultrasonic sensors, infrared sensors, or other similar sensors that may be utilized to detect various user inputs (e.g., user voice inputs, user gesture inputs, user touch inputs, user instrument inputs, user motion inputs, and so forth). The motors and actuators 160 may include any number of electronic motors (e.g., DC motors) that may be utilized to drive actuators, which may allow the robotic limb 102 to perform various mechanical operations and/or motional operations (e.g., walking, head and neck motions, limb and joint motions, body motions, dance motions, eye motions, and so forth). The display 162 may include any display architecture (e.g., LCD, OLED, e-Ink, and so forth), which may provide further means by which users may interact and engage with the robotic limb 102.

In certain embodiments, the input structures 164 may include any physical structures utilized to control one or more global functions of the robotic limb 102 (e.g., pressing a button to power "ON" or power "OFF" the robotic limb 102). The network interface 166 may include, for example, any number of network interfaces suitable for allowing the robotic limb 102 to access and receive data over one or more cloud-based networks (e.g., a cloud-based service that may service hundreds or thousands of the robotic limb 102 and the associated users corresponding thereto) and/or distributed networks. The power source 168 may include any suitable source of power, such as a rechargeable lithium polymer (Li-poly) battery and/or an alternating current (AC) power converter that may be utilized to power and/or charge the robotic limb 102 for operation. Similarly, the I/O interface 170 may be provided to allow the robotic limb 102 to interface with various other electronic or computing devices, such as one or more auxiliary electronic devices.

In particular embodiments, the onboard computing system 152 may instruct the robotic limb 102 to achieve a desired pose. The onboard computing system 152 may access sensor data representing a scene from one or more sensors. These sensors may comprise for example and not by way of limitation, one or more three-dimensional (3D) cameras, LIDAR, DVS, or RGB-D cameras. In particular embodiments, the sensor data may comprise image data (such as RGB-D or depth images). In particular embodiments, non-image based data (such as RFID data) may be used instead of, or in conjunction with, the image data. The sensor data may represent a scene that includes a least a portion of the robotic limb 102 that can thus be utilized by the computing device for various functions related to pose of the robotic limb 102. This disclosure contemplates that the one or more sensors can be located on the robotic limb 102 or external to the robotic limb 102, or both. Other sensors for sensing the pose of the robotic limb 102 may be built into the robotic system 100 of which the limb 102 is a part, and may include joint encoders, computation encoders, limit switches, motor current sensors, or any suitable combination thereof.

In particular embodiments, the onboard computing system 152 may isolate at least a portion of the sensor data that represents at least a portion of the robotic limb 102. As an example and not by way of limitation, this may be completed through a point cloud technique. In particular embodiments, the onboard computing system 152 may use 3D depth sensor data to record one or more snapshots of the point cloud of positional data points of the scene. These data points may include information about one or more external surfaces contained in the scene, including the external surfaces of the robotic limb 102, the table surface, and one or more objects contained in the scene. From this, the onboard computing system 152 may isolate a two-dimensional (2D) region that contains at least a portion of one or more objects contained within the scene. From at least a portion of the sensor data, the onboard computing system 152 may create one or more RGB-D clusters of various objects in the scene. In particular embodiments, the one or more RGB-D clusters of various objects includes the robotic limb 102 contained within the scene.

In particular embodiments, the scene may contain one or more objects that are further isolated by the onboard computing system 152. Upon isolating the one or more objects in the scene, the onboard computing system 152 may classify the one or more RGB-D clusters of various objects in the scene created from the portion of the sensor data. This classification may be conducted by the onboard computing system 152 via any method of classification, including for example and not by way of limitation manual identification by a user or any method of artificial intelligence, including computer vision, machine learning, neural networks, or deep learning. Variations of neural networks utilized for classification may include, for example and not by way of limitation, three-dimensional segmentation networks (3DSNs) such as three-dimensional convolutional neural networks (3DCNNs), Deep Kd-networks, regional convolutional neural networks (RCNNs), or recurrent neural networks (RNNs). In particular embodiments, this classification may determine that at least one of the one or more objects within a scene is a robotic limb 102. In particular embodiments, the onboard computing system 152 may additionally classify other objects contained within a scene, including for example but not by way of limitation, a coffee mug, a bottle, a vase, a spoon, a plate, a screwdriver, a light bulb, a hand or arm, etc.

While the present embodiments may be discussed below primarily with respect to a robotic limb, it should be appreciated that the present techniques may be applied to any of various robotic devices that may perform various operations to provide services to users. In particular embodiments, the robotic device may comprise any electronic device or computing device that may be configured with computer-based intelligence (e.g., machine learning [ML], artificial intelligence [AI], deep learning, cognitive computing, artificial neural networks [ANN], and so forth), which may be utilized by the robotic device to perform operations to provide services to users through, for example, motions, actions, gestures, body movements, facial expressions, limb and joint motions, display changes, lighting, sounds, and so forth. For example, in one embodiment, a robotic device may include a robot, a robotic limb, or similar AI or cognitive computing device that may be provided to contextually interact, instruct, operate, and engage with (e.g., in real-time or near real-time), for example, humans, pets, other robotic electronic devices, one or more servers, one or more cloud-based services, home appliances, electronic devices, automobiles, and so forth. Furthermore, as used herein, a robotic device may refer to any autonomous or semi-autonomous computing device capable of performing one or more mechanical and/or electromechanical motions or movements (e.g., human-like motions and movements) in response to, for example, one or more user inputs, one or more user commands (e.g., voice commands, gesture commands), one or more triggers (e.g., a time trigger, a keyword trigger, a tonal trigger, a user emotional response trigger, user motional trigger, a location trigger, an environmental trigger), and so forth.

Parameterized Waypoint Generation for Robotic Tasks

In particular embodiments, a robotic system 100 may generalize a task by transforming an idealized trajectory to fit the environment in which it may actually be deployed. The robotic system 100 may attach this transformed trajectory to the desired parent object so that even if that object moves, the trajectory moves with it. In particular embodiments, a parent object may be an object that is firstly determined as the one used for the idealized trajectory to complete the task. The robotic system 100 may detach and reparent the trajectory to new targets when appropriate. Taking cooking as an example, the aforementioned task generalization by transforming an idealized trajectory may be illustrated as follows. The robotic system 100 (e.g., comprising a robot arm) may generate an idealized trajectory that will result in the robot arm stirring sauce in a small pot. However, that small pot may be dirty, which requires the robotic system 100 to use a larger one (e.g., a medium pot) instead. Correspondingly, the robotic system 100 may automatically modify the idealized trajectory to fit the medium pot. Even if the medium pot is moved to a new burner, the modified trajectory may be able to follow it. If a user decides to transfer the sauce into an even bigger pot (e.g., a large pot) and wants the robotic system 100 to stir the sauce in the large pot, the robotic system 100 may detach the previously modified stirring trajectory from the medium pot and add it to the large pot, for which the robotic system 100 may once again scale or otherwise modify the previously modified trajectory to fit the large pot. As illustrated by the above example, the embodiments disclosed herein may be applied to robots deployed in home or cafeteria kitchens or serving stations to execute tasks such as stirring, serving, cutting, seasoning, cleaning, etc. These tasks may be easily generalized and adapted to different kitchens with different utensils, flatware, etc. based on the embodiments disclosed herein. Besides cooking, the embodiments disclosed herein may be applied to any suitable use case where a robotic system 100 is used to execute a task. As an example and not by way of limitation, for robot arms creating art, robot arms may autonomously adapt to different media sizes and positions. As another example and not by way of limitation, for robot arms mounted on a work desk or table, it may tidy up different desks equally well even with different sized objects on the table (e.g., pens). As yet another example and not by way of limitation, in fast food operations, a robot may scale and modify its trajectories successfully for from a first company to a second company, even if their cooktops/utensils/food items are of different sizes, oriented differently, or located in different locations. As yet another example and not by way of limitation, in cleaning application such as wiping down a dish, regardless of the size, orientation, and position, the robotic system 100 may modify the trajectory to wipe the whole plate. In any of the above use cases, the user may tell the robotic system 100 to change the task to focus on a different object by describing the new object in a way that differentiates the new object from the remaining objects in the scene. Accordingly, the robotic system 100 may automatically adapt the trajectory to that new object. Although this disclosure describes generalizing particular tasks by transforming particular trajectories by particular systems in a particular manner, this disclosure contemplates generalizing any suitable task by transforming any suitable trajectory by any suitable system in any suitable manner.

Certain technical challenges exist for dynamically updating trajectories responsive to object changes. One technical challenge may include transforming and adapting an idealized trajectory to changing conditions in the environment. The solutions presented by the embodiments disclosed herein to address this challenge may be parameterizing the trajectory plan and extracting pertinent variables from the parented object as the robotic system 100 may use those variables to update the parameterized trajectory plan to transform and adapt the idealized trajectory. Another technical challenge may include efficiently updating trajectories responsive to object changes. The solution presented by the embodiments disclosed herein to address this challenge may be a scene graph storing objects and their associated task parameter keys as the robotic system 100 may look up the scene graph to determine if required parameters are present for a new object when there is an object change and efficiently update the trajectory.

Certain embodiments disclosed herein may provide one or more technical advantages. A technical advantage of the embodiments may include the ability of robots to adapt their programmed motion to changes in the environment. Another technical advantage of the embodiments may include smooth and predictable motion paths, since they are based on an ideally designed path which are just modified to fit the changing variables of the environment. Another technical advantage of the embodiments may include increased safety for the user due to predictable motions. Another technical advantage of the embodiments may include no requirement for the end user to perform programming tasks as the robotic system 100 may automatically adapt the trajectories based on the task information. Certain embodiments disclosed herein may provide none, some, or all of the above technical advantages. One or more other technical advantages may be readily apparent to one skilled in the art in view of the figures, descriptions, and claims of the present disclosure.

In particular embodiments, the robotic system 100 may generate, for a task to be executed by the robotic system, a trajectory plan to complete the task. In order for this task to execute successfully, this trajectory plan may require the presence of a particular object in, on, or around which to perform this trajectory plan. As an example and not by way of limitation, a stirring trajectory plan may require the presence of a container in which stirring can occur. In order to ensure that a stirring trajectory plan can be successful, the robotic system 100 may first ensure that a container is present within the scene. Because there are a variety of ways to classify a container, the trajectory plan may include a prerequisite for execution, that an object with sufficiently similar characteristics to the required object be present. As an example and not by way of limitation, the robotic system 100 may specify that for a detected object to be considered a "container": it may need to be cylindrical in shape, it may need to have a minimum height, and it may need to be located within an expected range of positions (e.g. on a stovetop). The robotic system 100 may then identify one or more objects in the environment that meet these prerequisites required for completing the task. In particular embodiments, the robotic system 100 may then determine one or more attributes for each of the one or more identified objects, which may affect the trajectory plan. As an example and not by way of limitation, if an idealized stirring trajectory had been generated assuming a pot diameter of 250 mm but instead only a 500 mm diameter pot is present, the execution of the stirring task may be undesirable without parametrizing waypoint generation due to the fact that ingredients near the sides of the pot may not be stirred. The robotic system 100 may then determine one or more trajectory-parameters (such as pot width) for the trajectory plan based on the determined attributes for each identified object and one or more operational conditions in an environment associated with the robotic system 100. In particular embodiments, the robotic system 100 may further execute the task based on the determined trajectory-parameters for the trajectory plan.

Industrial robotics settings may be largely structured and designed in a way to allow for robot devices to move in repeated motions in order to complete a task. For example, in industrial settings robots may overwhelmingly deal with pick and place operations. These processes may only focus on the optimal way to pick up objects and place them down in another location. In these operations, the objects to be picked may be typically identical, but have different positions and orientations. Conventional work may employ vision algorithms to calculate an acceptable approach vector and then guide the robot to grasp and move the object. In these cases, the objects may not vary in shape or size so the robot may not have to adapt its planning to accommodate new or unknown objects that it sees. Furthermore, the interaction between the robot and the object may be minimized to grasping, as opposed to doing something more complex such as navigating within the object and cleaning its internal surfaces. Even though there may be examples of robots performing cleaning actions on the interior of specific parts, if a new part were to be presented with which the robot was unfamiliar, it may fail to complete the task at hand. An industrial example that utilizes vision and a robot-held tool may involve welding robots commonly seen in automotive assembly lines. The welding operations may be the same from car to car but minor deviations in position or orientation of the car part to be welded may be detected by vision systems and the position and location of the weld may be slightly adjusted to accommodate this error. In this example, there may be an ideal location for the weld to happen with only a minor tolerance for deviations. For example, if the car part were to be significantly out of place, or more importantly, if the car part was a door from a different model of car than expected, the results may be catastrophic (or the robot may enter a failsafe mode where no welding was performed).

Different from these pick and place operations, the embodiments disclosed herein focus on robotic trajectories that get modified directly by the environment while the robot is holding a tool that has already been picked. Specifically, the embodiments disclosed herein may be particularly suitable for non-industrial robotics settings, e.g., at home specifically in the kitchen. Compared with industrial robotics settings, non-industrial robotics settings may be unstructured. The pick and place operations in industrial robotics settings may focus on the picking up and dropping off of the object, for which the robotic system 100 may not intend to do something with the object while it is in possession of the robot. In non-industrial robotics settings, for a robotic system 100 to complete even a relatively simple task like stirring a pot of sauce on a stove, there may be many more variables at play than in a structured industrial environment. While the act of stirring a pot may be described in a generalized way, i.e., moving the spoon in a circular motion, ensuring that the sides and bottom of the pot are scraped (touching the sides and bottom of the pot/pan) to avoid burning, etc., a robotic system 100 may not be able to successfully complete this task without a great deal of additional information about the kitchen. For example, where is the pot? How big is it? How deep is the pot? If there are multiple pots, which one did the user intend the robot device to use? If the pots are of drastically different sizes, how does the robotic system adapt the task to a new pot? Furthermore, the robotic system 100 may need to be able to understand how a spoon (for example) should move within a pot not just how to put the spoon down. The embodiments disclosed herein may be able to perform complex motions with the tool in hand such as stirring food and/or sauce in a pot, for which conventional robotic systems dealing with pick and place operations may be insufficient to be able to perform the motions required to complete these complex tasks.

It may be trivial these days to be able to program a robotic system 100 (e.g., comprising a robot arm) to move in an arbitrary and repeatable motion path. While it gives the impression that the robot is easy to use and program, this ability may not actually provide the necessary results to complete useful autonomous tasks. For example, if a user programs a robot to stir a small pot with a spoon using this method, it may only be successful as long as a sufficiently similar pot being used each time, the amount of ingredients to stir being similar each time, the pot being located in the same location each time, and the human taking care of placing and removing the pot on their own. All these strict conditions may pose major problems in a dynamic environment like the kitchen (which may be unique to each individual and drastically different household to household). If the user is required to ensure all the above conditions are met, the robot may not be perceived as useful.

Generalizing a robot task like stirring a pot may be hard because even though there are similar steps taken each time for a robotic system 100 to stir, there may be a number of variables that make a one-size-fits-all stirring trajectory too rigid to adapt to the changing variables in the kitchen. Even within the industrial robotics settings, robot path planning may typically be done as a complex state machine or decision tree that is inflexible to change outside of a small set of variables. This type of programming may be done by experts who make customized solutions for a specific application within a specific, generally unchanging, environment. In response to such inflexibility to changes, some robot manufacturers tout the ease of use and end-user programmability of their products. However, these robotic systems may fall short of being able to perform useful tasks without requiring a great deal of expertise from the user. In addition, their robot programming interfaces may be not capable of adapting programmed motion to changes in the environment. They may be able to do simple things like detect a change and perform a second preprogrammed motion, but they may be unable to do something like the following task: "given a programmed motion of stirring a large pot of liquid on a stove, now try to stir a pot that is half the size, and is located on a different burner on the stove."

In comparison with the aforementioned conventional robot trajectory planning, the embodiments disclosed herein may allow for the object that affects a planned trajectory to be in a completely different position and orientation than expected. Moreover, the embodiments disclosed herein may also allow the object to be of a different size and have different characteristics than the expected (or ideal) version of that geometry. Continuing with the cooking example, once a parameterized stirring path is generated with one pot, the embodiments disclosed herein may enable a robotic system 100 to perform this stirring task successfully in any pot, pan, or container even if the robotic system 100 has never before seen these new pots or pans from the vision perspective. As a result, the robotic system 100 may have a technical advantage of the ability of robots to adapt their programmed motion to changes in the environment.

In particular embodiments, the robotic system 100 may generalize a task based on the following approaches. The robotic system 100 may not just analyze the environment to detect known objects and find their positions. In particular embodiments, the one or more objects may be identified based on sensor data captured by one or more sensors associated with the robotic system 100. The robotic system 100 may look into the environment and create a list of all objects and all their attributes (e.g., size, shape, color, texture, etc.). In particular embodiments, the one or more attributes may be determined based on sensor data captured by one or more sensors associated with the robotic system 100. As an example and not by way of limitation, the attributes may be determined based on sensor data captured by RGB and depth sensors. Although this disclosure describes determining particular attributes by particular systems in a particular manner, this disclosure contemplates determining any suitable attribute by any suitable system in any suitable manner.

If an object in the environment meets the requirements for acting as an object that should update (modify) the idealized trajectory (i.e., trajectory plan), its attributes may be fed to a parametric trajectory generator which then generates an updated trajectory whose properties are informed by the detected object. In particular embodiments, the idealized trajectory (i.e., trajectory plan) may be a trajectory that is designed for a specific (or arbitrary) object (e.g., a pot) to complete a particular task (e.g., stirring). The trajectory plan may comprise a series of waypoints in a three-dimensional (3D) space in the environment associated with the robotic system 100. This pot may have a specific size so the idealized trajectory may be informed by this size. However, if the next time the robot system 100 is asked to stir, a larger pot is found instead, the robotic system 100 may adjust the idealized trajectory to fit this new pot no matter how complex the motion is. As the environment changes, the robotic system 100 may keep updating the trajectory to ensure that the trajectory will allow the robot system 100 to successfully complete the task, even if the original object in the environment has been removed and placed by a foreign object. As a result, the robotic system 100 may have a technical advantage of smooth and predictable motion paths, since they are based on an ideally designed path which are just modified to fit the changing variables of the environment. Although this disclosure describes generating particular trajectories by particular systems in a particular manner, this disclosure contemplates generating any suitable trajectory by any suitable system in any suitable manner.

In particular embodiments, at a high level, the robotic system 100 may work in the following way. To begin with, the robotic system 100 may create a trajectory plan that completes a task for a given set of parameters. As an example and not by way of limitation, the robotic system 100 may design a stirring trajectory based on the size, orientation, and location of a single pot on the stove. In particular embodiments, the trajectory plan may be generated in a number of ways including but not limited to, digitally creating a series of target points in the three-dimensional (3D) space using a computer program, or by manually manipulating the robot system 100 and recording a series of positions. Although this disclosure describes generating particular trajectory plans by particular systems in a particular manner, this disclosure contemplates generating any suitable trajectory plan by any suitable system in any suitable manner.

In particular embodiments, the robotic system 100 may parameterize the trajectory plan so that it may be able to transform and adapt to changing conditions in the environment. This means that the trajectory, or sub-parts of the trajectory, may be enabled to transform in various ways. As an example and not by way of limitation, the robotic system 100 may take the middle 50% of waypoints of the trajectory and allow them to, as a group, be scaled in any direction, rotated in any axis, or moved in any direction. In particular embodiments, the robotic system 100 may attach the parameterized trajectory plan (may be referred as "child" throughout this disclosure) to one or more objects (may be referred as "parent(s)" throughout this disclosure) within the environment. This means that as this parent object moves or rotates in space, so too will the trajectory. Although this disclosure describes parameterizing particular trajectory plans by particular systems in a particular manner, this disclosure contemplates parameterizing any suitable trajectory plan by any suitable system in any suitable manner.

In particular embodiments, the robotic system 100 may use computer vision or other sensing methods to extract pertinent variables from the parented object. As an example and not by way of limitation, the trajectory may define a stirring motion in a pot and the parented object may be a large pot which is twice as big as the original trajectory was designed for. By extracting the height and diameter of the pot (e.g., using computer vision or other sensing methods), the robotic system 100 may scale the trajectory to fit this new pot. Some parts of the trajectory may not need to change regardless of pot size (e.g., bringing a spoon over to the pot in the first place). In particular embodiment, the robotic system 100 may selectively modify only a subset of the trajectory. Accordingly, determining the one or more trajectory-parameters for the trajectory plan may comprise adjusting a subset of the series of waypoints based on one or more of the determined attributes for one or more of the identified objects and determining the one or more trajectory-parameters for the trajectory plan based on the adjustment of the subset of the series of waypoints. In particular embodiments, adjusting the subset of the series of waypoints may comprises one or more of scaling the subset of the series of waypoints in one or more directions, rotating the subset of the series of waypoints in one or more axes, or moving the subset of the series of waypoints in one or more directions. Although this disclosure describes adjusting particular waypoints by particular systems in a particular manner, this disclosure contemplates adjusting any suitable waypoint by any suitable system in any suitable manner.

In particular embodiments, the robotic system 100 may use those variables to update the parameterized trajectory plan. If at any time the user or robotic system 100 chooses a new parent object for the parametrized trajectory plan, the trajectory plan is unparented, reparented, and updated with the new parameters extracted from the new parent object. As an example and not by way of limitation, if the user were to indicate through voice command, app interaction, or otherwise, that they want the robot system 100 to now stir a smaller pot, the robotic system 100 may unparent this trajectory, reparent it to the smaller pot, and transform the relevant parts of the trajectory to this smaller pot in its new location. As can be seen, the robotic system 100 may have a technical advantage of no requirement for the end user to perform programming tasks as the robotic system 100 may automatically adapt the trajectories based on the task information. Parameterizing the trajectory plan and extracting pertinent variables from the parented object may be effective solutions for addressing the technical challenge of transforming and adapting an idealized trajectory to changing conditions in the environment, as the robotic system 100 may use those variables to update the parameterized trajectory plan to transform and adapt the idealized trajectory. Although this disclosure describes updating particular trajectories by particular systems in a particular manner, this disclosure contemplates updating any suitable trajectory by any suitable system in any suitable manner.

Figure 2A:
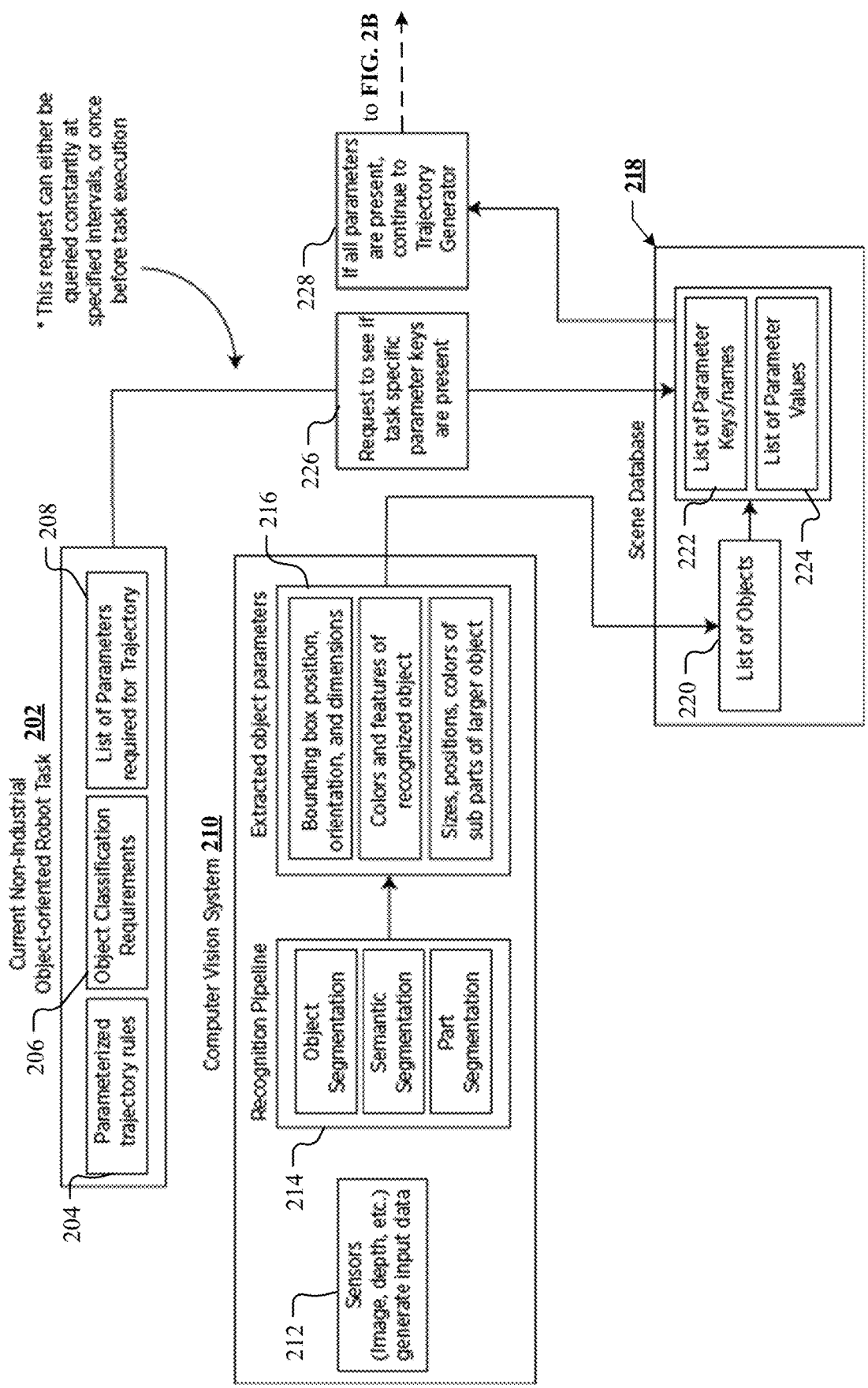
FIG. 2A illustrates the first part of an example generalized block diagram for dynamically updating trajectories responsive to object changes.
Figure 2B:
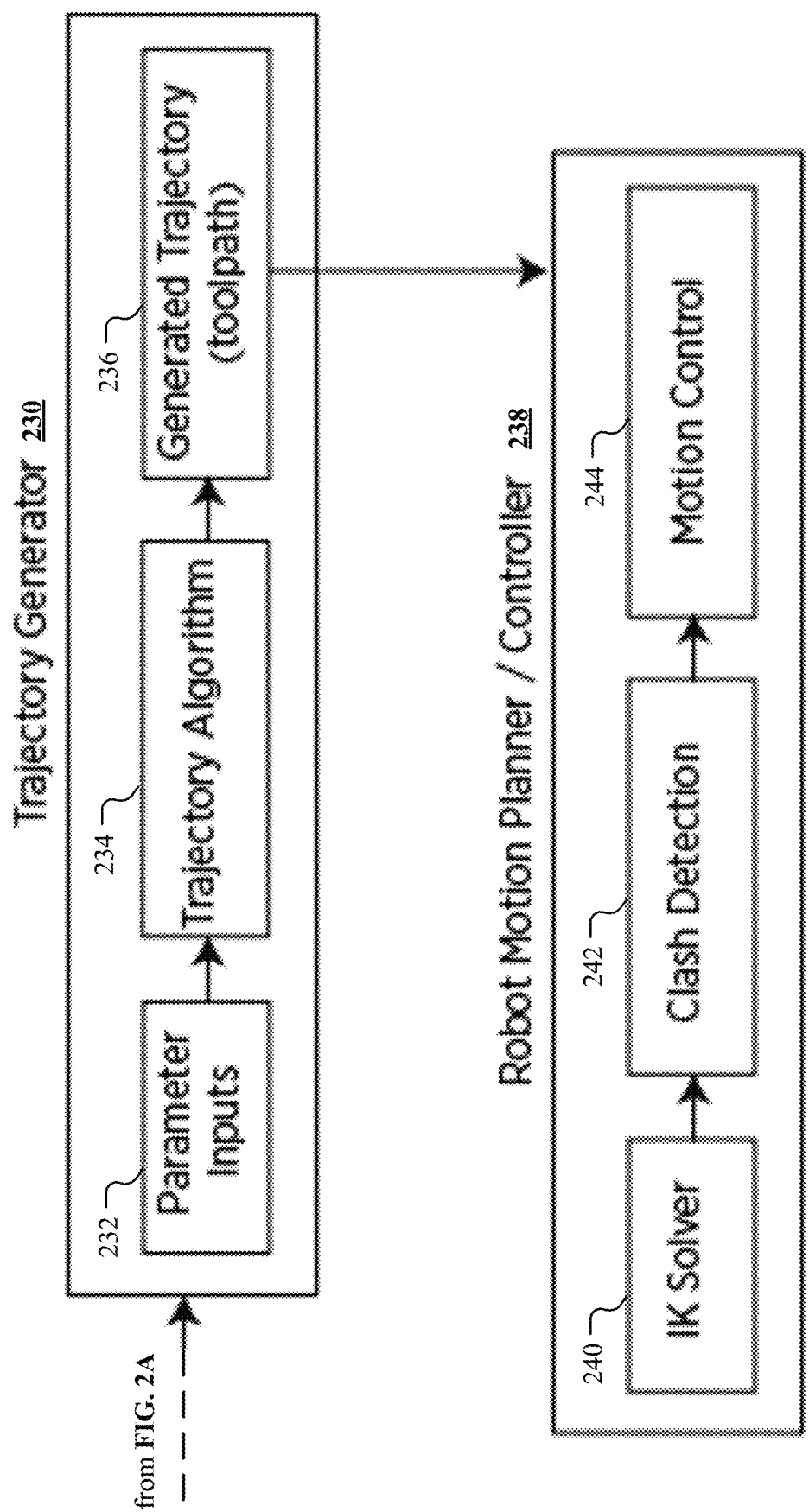
FIG. 2B illustrates the second part of the example generalized block diagram for dynamically updating trajectories responsive to object changes.

FIGS. 2A-2B illustrate an example generalized block diagram for dynamically updating trajectories responsive to object changes. FIG. 2A illustrates the first part of an example generalized block diagram for dynamically updating trajectories responsive to object changes. As illustrated in FIG. 2A, the block diagram may start with the current non-industrial object-oriented robot task 202, which may include parameterized trajectory rules 204, object classification requirements 206, and a list of parameters required for trajectory 208. Such task may be a task in a home, retail, or other non-industrial setting where the completion of the task requires the robot device to move along a trajectory defined relative to a physical object in space. As an example and not by way of limitation, the trajectory for a robot stirring a pot necessarily relates to the object in which a mixture is being stirred. For that mixture to be stirred successfully, the trajectory may take into account certain attributes of the object. Although this disclosure describes particular tasks in a particular manner, this disclosure contemplates any suitable task in any suitable manner.

The computer vision system 210 may be a system that comprises one or more sensors 212 that take in data. Such sensors may include, but not limited to, RGB cameras, depth sensors, temperature sensors, distance sensors, etc. The data may be then processed through various recognition pipelines 214, including object segmentation (i.e., a set of data is separate from the rest), semantic segmentation (e.g., the set of data should be considered a "pot" or a "pan"), and part segmentation (e.g., for a kettle where is the handle and where is the spout?). The data may be analyzed to generate extracted object parameters 216, including bounding box positions, orientation, dimensions, colors and features of recognized object, and sizes, positions, colors of sub parts of larger object, etc. As an example and not by way of limitation, the object segmentation may yield the width and height of the object by looking at the dimensions of the bounding box of the point cloud. Although this disclosure describes processing particular sensor data in a particular manner, this disclosure contemplates processing any suitable sensor data in any suitable manner.

Once the above attributes have been measured, they may be stored as data entries associated with the object they come from in a scene database 218. The scene database may comprise all sensed data that describes the environment. As an example and not by way of limitation, such data may comprise a list of objects 220, which may be associated with a list of parameters keys/names 222 and a list of parameter values 224. Although this disclosure describes particular databases in a particular manner, this disclosure contemplates any suitable database in any suitable manner.

Based on the current non-industrial object-oriented robot task 202, the robotic system 100 may request to see if task specific parameter keys are present 226 in the scene database 218. In particular embodiments, this request can either be queried constantly at specified intervals, or once before task execution. At block 228, if all parameters are present, the robotic system 100 may continue to trajectory generator, which is to be continued being illustrated in FIG. 2B.

FIG. 2B illustrates the second part of the example generalized block diagram for dynamically updating trajectories responsive to object changes. Once a specific object is identified to apply the trajectory of a task trajectory to, the trajectory generator 230 may look up the required trajectory parameters associated with that object and apply them to the trajectory. As illustrated in FIG. 2B, the trajectory generator 230 may use parameter inputs 232 associated with the identified object and a trajectory algorithm 234 to generate a brand new trajectory (toolpath) 236 relative to the sensed object. The scene graph storing objects and their associated task parameter keys may be an effective solution for addressing the technical challenge of efficiently updating trajectories responsive to object changes as the robotic system 100 may look up the scene graph to determine if required parameters are present for a new object when there is an object change and efficiently update the trajectory. Although this disclosure describes particular trajectory parameters in a particular manner, this disclosure contemplates any suitable trajectory parameter in any suitable manner.

The motion planner/controller 238 may translate the planned trajectories into robot motion. There may be a variety of ubiquitous tools in this domain that may be used to enact the execution of the above workflow. As an example and not by way of limitation, the motion planner/controller 238 may use an inverse kinematic (IK) solver 240 for clash detection 242. Based on the clash detection 242 result, the motion planner/controller 238 may conduct motion control 244. As a result, the robotic system may have a technical advantage of increased safety for the user due to predictable motions. Although this disclosure describes translating particular trajectories by particular systems in a particular manner, this disclosure contemplates translating any suitable trajectory by any suitable system in any suitable manner.

Figure 3:
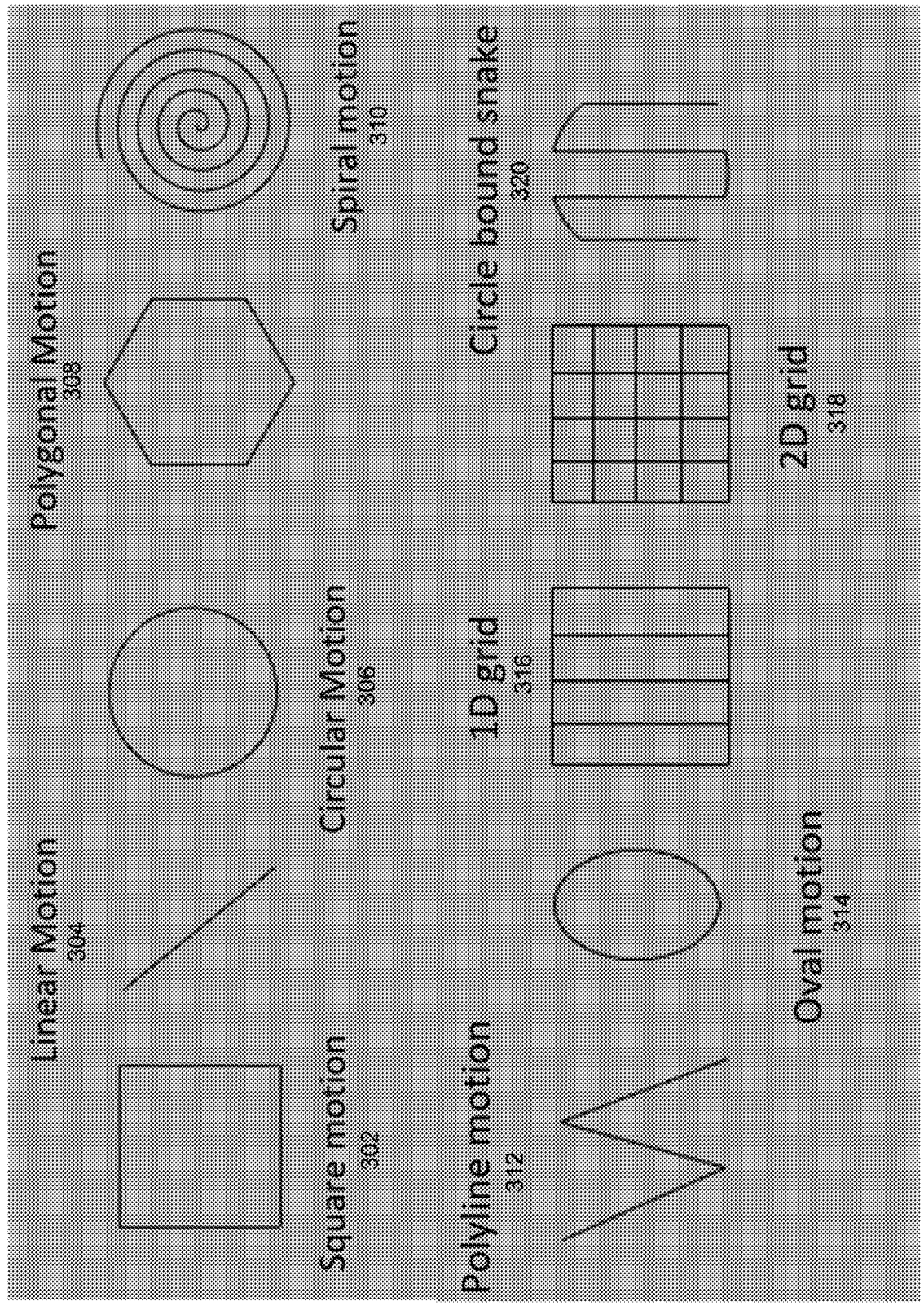
FIG. 3 illustrates an example of a catalogue of simple "primitive" motions.

FIG. 3 illustrates an example of a catalogue of simple "primitive" motions. As illustrated in FIG. 3, these "primitive" motions may comprise square motion 302, linear motion 304, circular motion 306, polygonal motion 308, spiral motion 310, polyline motion 312, oval motion 314, one-dimensional (1D) grid 316, two-dimensional (2D) grid 318, circle bound snake 320. Each primitive motion in FIG. 3 may have built-in parameters which may easily change how a robot would move along these trajectories. As an example and not by way of limitation, circular motion 306 may have parameters such as center, radius, and number of turns. As another example and not by way of limitation, spiral motion 310 may have parameters such as center and radius. As yet another example and not by way of limitation, circle bound snake 320 may have parameters such as center, radius, and number of rows. In particular embodiments, each of these motions may be modified by changing any of their defining parameters. As an example and not by way of limitation, if a user wants the robot device to move in a circle, the user may need to specify the origin point of the circle and a radius or diameter. As another example and not by way of limitation, if a user wants the robot device to move in a spiral, the user may need to specify the same things as a circle with the additional parameter of how many turns to make in the given radius. Although this disclosure describes particular motions in a particular manner, this disclosure contemplates any suitable motion in any suitable manner.

In order to design a stirring path from primitive motions, the robotic system 100 may choose the primitive motions that best satisfy the requirements of successful stirring. Take cooking as an example. To mix the ingredients fully, the robotic system 100 may need to move in a way that brings the spoon into contact with as much of the ingredients as possible. A spiral primitive may be a good solution for this. To scrape the side of the pot to prevent food from burning, the robotic system 100 may need to move the spoon in a circular path along the walls of the pot. A circle primitive motion may be good for this. To scrape the bottom of the pot, the robotic system 100 may need to bring the spoon edge in contact with as much of the bottom of the pot as possible. A snaking back-and-forth primitive motion may be appropriate for this and it may need to be bound by a circle. As a result, the robotic system 100 may choose the circle-bound snake primitive.

In particular embodiments, these parameters may be set by (or connected to) values measured from the pot by using computer vision methods. A simple example is that the center of the spiral may need to be located at the center of the pot. A more complex example is that the number of turns in the spiral may be a function of the size of the spoon since a smaller spoon may have to make more revolutions to make contact with all of the ingredients.

In particular embodiments, an important requirement of being able to dynamically change the parent object of the geometrically transformed trajectory may be to understand what objects are present in the environment. In order to achieve this, the embodiments disclosed herein may catalogue the perceived attributes of objects in the environment in a scene database. In particular embodiments, the robotic system 100 may further access the scene database comprising a plurality of data entries. Each data entry may comprise an object identifier (ID), an object category associated with the object ID, one or more attributes associated with the object ID, and one or more trajectory-parameters corresponding to the object ID. This database may store important data of objects that may be retrieved on command. As an example and not by way of limitation, if two objects are detected in an environment on a table using an RGB camera and a segmentation algorithm to distinguish between the table, the first object and the second object, even without classifying the object (knowing what the object is) one may store pertinent information about the object such as relative size (e.g., the first object is the largest object in the environment and the second object is smaller), or color (the first object is mostly blue and the second object is mostly green). Although this disclosure describes generating particular databases by particular systems in a particular manner, this disclosure contemplates generating any suitable database by any suitable system in any suitable manner.

In particular embodiments, if there is a trajectory designed for an arbitrary object (e.g., stirring path for a small pot), a user may now request that the robotic system 100 attach the idealized trajectory to "the largest" object. The user may submit such request through voice command, app interaction, or in response to any number of conditions. If the requested object happens to meet the requirements of the trajectory (e.g., if the object is a cylindrical container as in the stirring example), the task may be allowed to continue provided that the subsequently required parameters are able to be measured by the computer vision system.

Figure 4:
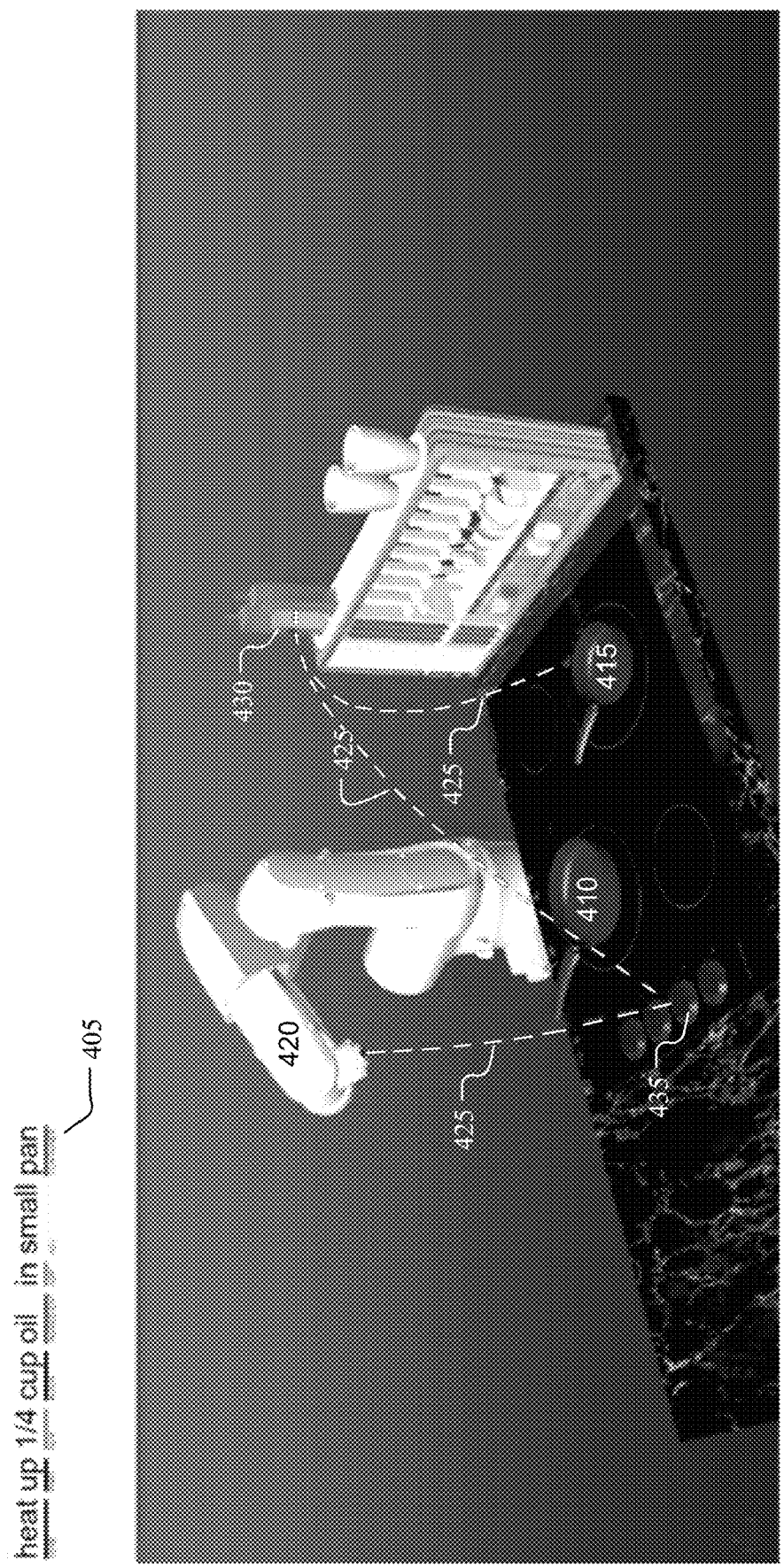
FIG. 4 illustrates example attachments of trajectories to different objects.

FIG. 4 illustrates example attachments of trajectories to different objects. These trajectories may be attached to different objects by request. In FIG. 4, the command 405 may be "heat up ¼ cup oil in small pan." When the command 405 contains a descriptor of the desired pot (e.g., small pan), that pot may be chosen as the parent object for the trajectory. The trajectories may be predefined but may be updated with data from the environment. The parented objects in this case may be the two pans which become distinguished from one another by user description (i.e., large pan 410 versus small pan 415). Once the trajectory is attached to the new object (e.g., desired small pan 415 in the command 405), it may need to have its parameters adjusted such that the trajectory creates waypoints relative to this new object to make sure the task at hand would be completed successfully. The idealized trajectory may have a limited number of parameters that may be changeable. These parameters may be exposed for the robotic system to change when the relevant parameters are measured in the environment and queried from the scene database. In addition, other parameters may be utilized to modify the waypoints that do not exist in the scene database, but are otherwise provided by the user, or gathered from a separate database, or the internet. As illustrated in FIG. 4, the robot arm 420 may follow the updated trajectory 425 with adjusted parameters to fetch oil 430, pour it into the small pan 415, and then turn on the corresponding stove turner 435. Although this disclosure describes attaching particular trajectories by particular systems in a particular manner, this disclosure contemplates attaching any suitable trajectory by any suitable system in any suitable manner.

Figure 5A:
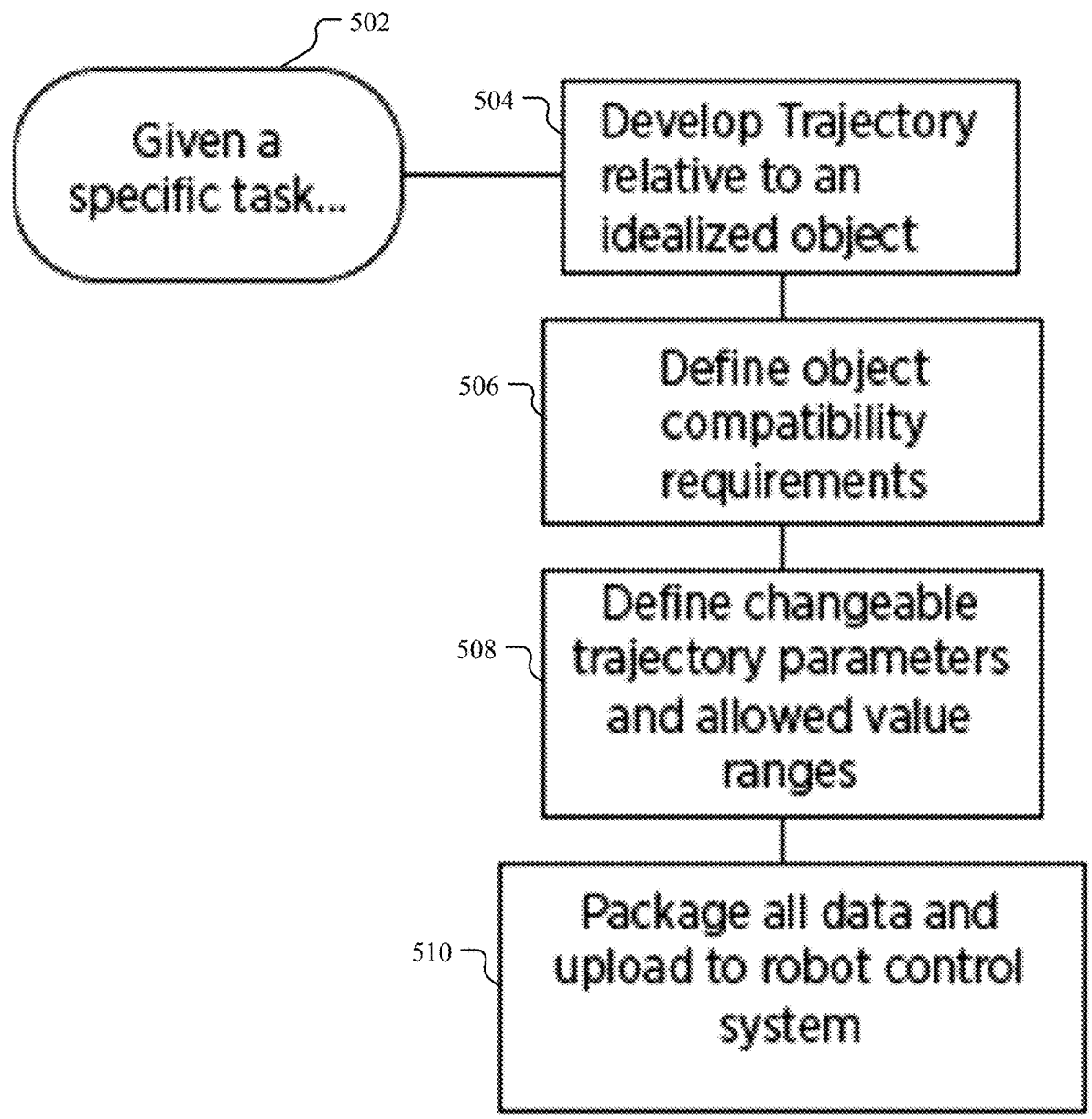
FIG. 5A illustrates an example generalized flow chart for generating the parameterized task by using the robotic system.
Figure 5B:
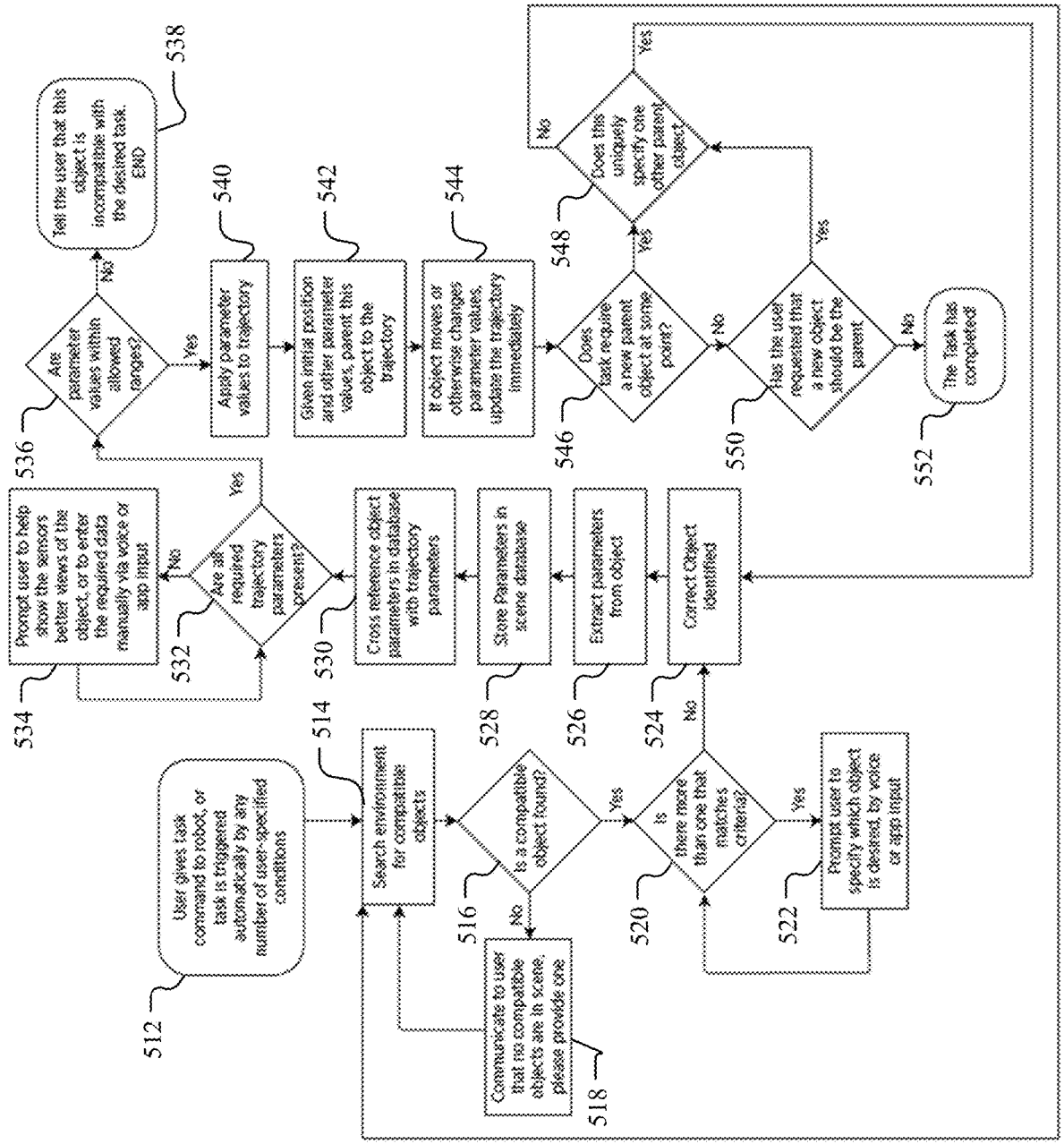
FIG. 5B illustrates an example generalized flow chart for performing the parameterized task by using the robotic system.

FIGS. 5A-5B illustrate an example generalized flow chart of the use of the robotic system 100. FIG. 5A illustrates an example generalized flow chart for generating the parameterized task by using the robotic system 100. At step 502, the robotic system 100 may be given a specific task. At step 504, the robotic system 100 may develop trajectory relative to an idealized object. At step 506, the robotic system 100 may define object compatibility requirements. At step 508, the robotic system 100 may define changeable trajectory parameters and allowed value ranges. At step 510, the robotic system 100 may package all data and upload to the robot control system. Although this disclosure describes particular flow chart of using particular systems in a particular manner, this disclosure contemplates any suitable flow chart of using any suitable system in any suitable manner.

FIG. 5B illustrates an example generalized flow chart for performing the parameterized task by using the robotic system 100. At step 512, a user may give task command to robot, or task may be triggered by any number of user-specified conditions. At step 514, the robotic system 100 may search the environment for compatible objects. At step 516, the robotic system 100 may determine if a compatible object is found. If a compatible object is not found, the robotic system 100 may proceed to step 518, where the robotic system 100 may communicate to user that no compatible objects are in scene, asking user to provide one. The robotic system 100 may return to step 514 and repeat steps 514 to 516 until a compatible object is found. Upon finding the compatible object, the robotic system 100 may determine if there is more than one object that matches the criteria at step 520. If there is more than one object, the robotic system 100 may prompt the user to specify which object is desired, by voice or app input at step 522. If there isn't more than one object, the robotic system 100 may determine that the correct object is identified at step 524. The robotic system 100 may proceed to step 526, wherein the robotic system 100 may extract parameters from the object. At step 528, the robotic system 100 may store the parameters in the scene database. At step 530, the robotic system 100 may cross-reference object parameters in the database with trajectory parameters. At step 532, the robotic system 100 may determine if all required trajectory parameters are present. If not all required trajectory parameters are present, the robotic system 100 may prompt the user to help show the sensors better views of the object, or to enter the required data manually via voice or app input at step 534. If all required trajectory parameters are present, the robotic system 100 may determine if the parameter values are within the allowed ranges at step 536. If the parameter values are not within the allowed ranges, the robotic system 100 may tell the user that this object is incompatible with the desired task and end the process at step 538. If the parameter values are within the allowed ranges, the robotic system 100 may apply parameter values to the trajectory at step 540. At step 542, given initial position and other parameter values, the robotic system 100 may parent this object to the trajectory. At step 544, if object moves or otherwise changes parameter values, the robotic system 100 may update the trajectory immediately. At step 546, the robotic system 100 may determine if the task requires a new object at some point. If the task requires a new object, the robotic system 100 may determine if this uniquely specifies one other parent object at step 548. If this uniquely specifies one other parent object, the robotic system 100 may return to step 524. If this doesn't uniquely specify one other parent object, the robotic system 100 may return to step 514. If the task doesn't require a new object, the robotic system 100 may determine if the user has requested that a new object should be the parent at step 550. If the user has requested that a new object should be the parent, the robotic system 100 may go to step 548. If the user hasn't requested that a new object should be the parent, the robotic system 100 may determine that the task has completed at step 552. Although this disclosure describes particular flow chart of using particular systems in a particular manner, this disclosure contemplates any suitable flow chart of using any suitable system in any suitable manner.

Figure 6A:
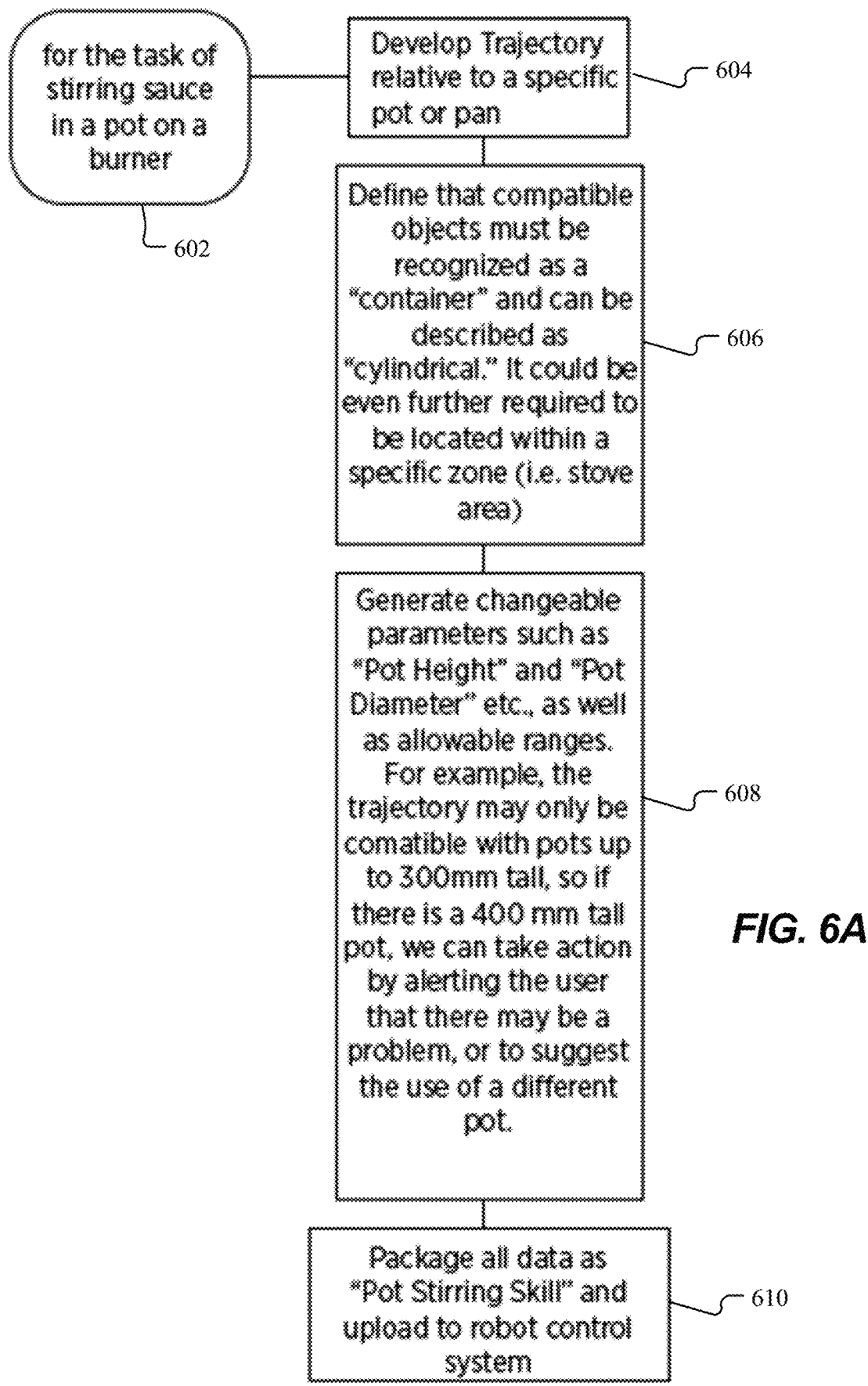
FIG. 6A illustrates an example generalized flow chart for generating the parameterized task of stirring sauce by using the robotic system.
Figure 6B:
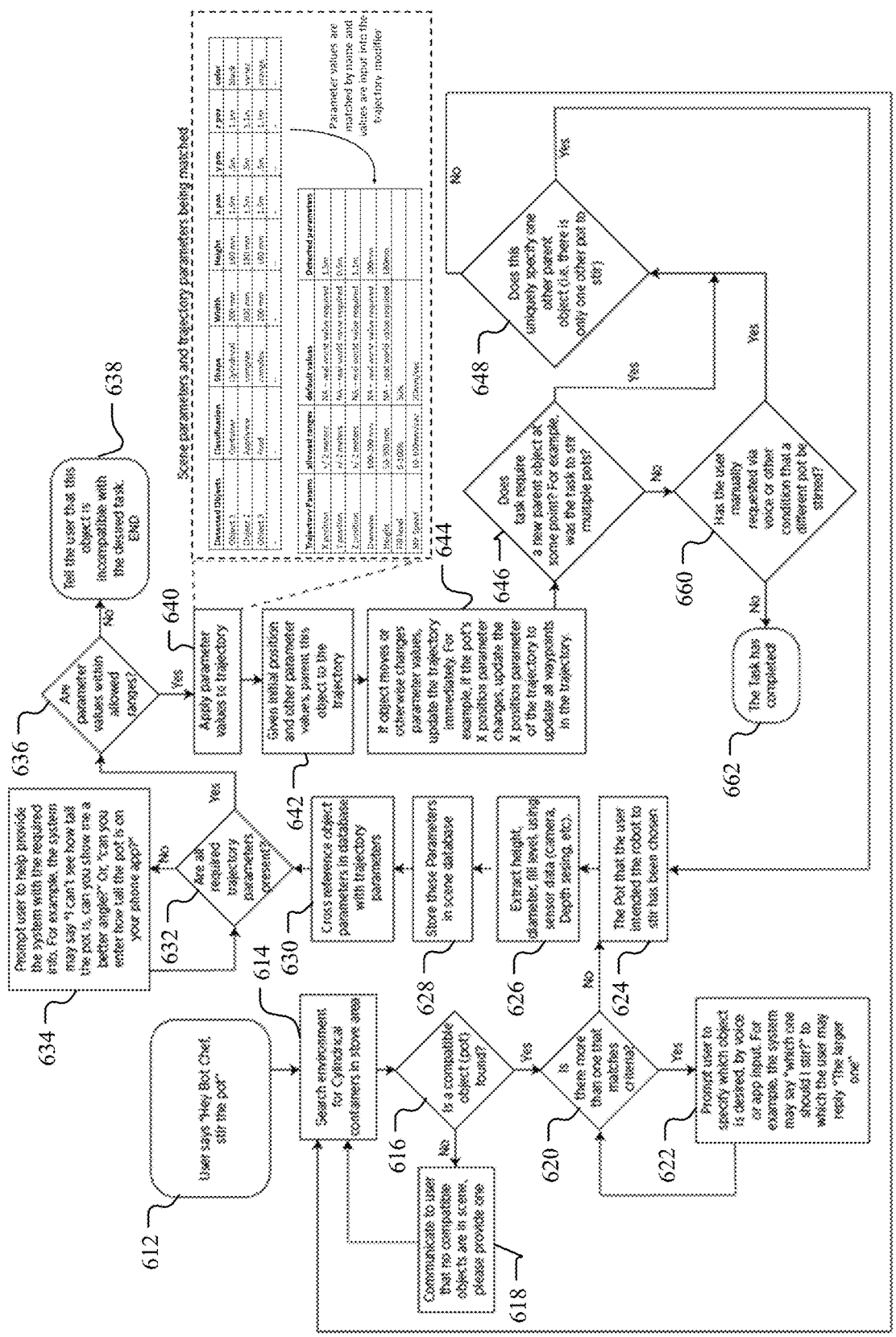
FIG. 6B illustrates an example generalized flow chart for performing the parameterized task of stirring sauce by using the robotic system.

FIGS. 6A-6B illustrate an example generalized flow chart of the use of the robotic system 100 applied to a specific task. FIG. 6A illustrates an example generalized flow chart for generating the parameterized task of stirring sauce by using the robotic system 100. At step 602, the robotic system 100 may be given a specific task, e.g., stirring sauce in a pot on a burner. At step 604, the robotic system 100 may develop trajectory relative to a specific pot or pan. At step 606, the robotic system 100 may define that compatible objects must be recognized as a "container" and can be described as "cylindrical." It could be even further required to be located within a specific zone (i.e., stove area). At step 608, the robotic system 100 may generate changeable trajectory parameters such as "pot height" and "pot diameter" etc., as well as allowable ranges. For example, the trajectory may only be compatible with pots up to 300 mm tall, so if there is 400 mm tall pot, the robotic system 100 may take action by alerting the user that there may be a problem, or to suggest the user of a different pot. At step 610, the robotic system 100 may package all data as "pot stirring skill" and upload to the robot control system. Although this disclosure describes particular flow chart of using particular systems in a particular manner, this disclosure contemplates any suitable flow chart of using any suitable system in any suitable manner.

FIG. 6B illustrates an example generalized flow chart for performing the parameterized task of stirring sauce by using the robotic system 100. At step 612, a user may say "hey bot chef, stir the pot." At step 614, the robotic system 100 may search the environment for cylindrical containers in stove area. At step 616, the robotic system 100 may determine if a compatible object (pot) is found. If a compatible object is not found, the robotic system 100 may proceed to step 618, where the robotic system 100 may communicate to user that no compatible objects are in scene, asking user to provide one. The robotic system 100 may return to step 614 and repeat steps 614 to 616 until a compatible object is found. Upon finding the compatible object, the robotic system 100 may determine if there is more than one object that matches the criteria at step 620. If there is more than one object, the robotic system 100 may prompt the user to specify which object is desired, by voice or app input at step 622. For example, the system may say "which one should I stir?" to which the user may reply "the larger one." If there isn't more than one object, the robotic system 100 may determine that the pot the user intended the robot to stir has been chosen at step 624. The robotic system 100 may proceed to step 626, wherein the robotic system 100 may extract height, diameter, and fill level using sensor data (camera, depth sensing, etc.). At step 628, the robotic system 100 may store these parameters in the scene database. At step 630, the robotic system 100 may cross-reference object parameters in the database with trajectory parameters. At step 632, the robotic system 100 may determine if all required trajectory parameters are present. If not all required trajectory parameters are present, the robotic system 100 may prompt the user to help provide the system with required information at step 634. For example, the system may say "I can't see how tall the pot is, can you show me a better angle?" or "can you enter how tall the pot is on your phone app?" If all required trajectory parameters are present, the robotic system 100 may determine if the parameter values are within the allowed ranges at step 636. If the parameter values are not within the allowed ranges, the robotic system 100 may tell the user that this object is incompatible with the desired task and end the process at step 638. If the parameter values are within the allowed ranges, the robotic system 100 may apply parameter values to the trajectory at step 640. Within step 640, scene parameters and trajectory parameters may be matched, in which parameter values may be matched by name and values may be input into the trajectory modifier. At step 642, given initial position and other parameter values, the robotic system 100 may parent this object to the trajectory. At step 644, if object moves or otherwise changes parameter values, the robotic system 100 may update the trajectory immediately. For example, if the pot's X position parameter changes, the system may update the X position parameter of the trajectory to update all waypoints in the trajectory. At step 646, the robotic system 100 may determine if the task requires a new object at some point, e.g., was the task to stir multiple pots? If the task requires a new object, the robotic system 100 may determine if this uniquely specifies one other parent object (i.e., there is only one other pot to stir) at step 648. If this uniquely specifies one other parent object, the robotic system 100 may return to step 624. If this doesn't uniquely specify one other parent object, the robotic system 100 may return to step 614. If the task doesn't require a new object, the robotic system 100 may determine if the user has manually requested via voice or other condition that a different pot be stirred at step 660. If the user has requested that a different pot be stirred, the robotic system 100 may go to step 648. If the user hasn't requested that a different pot be stirred, the robotic system 100 may determine that the task has completed at step 662. Although this disclosure describes particular flow chart of using particular systems in a particular manner, this disclosure contemplates any suitable flow chart of using any suitable system in any suitable manner.

Figure 7A:
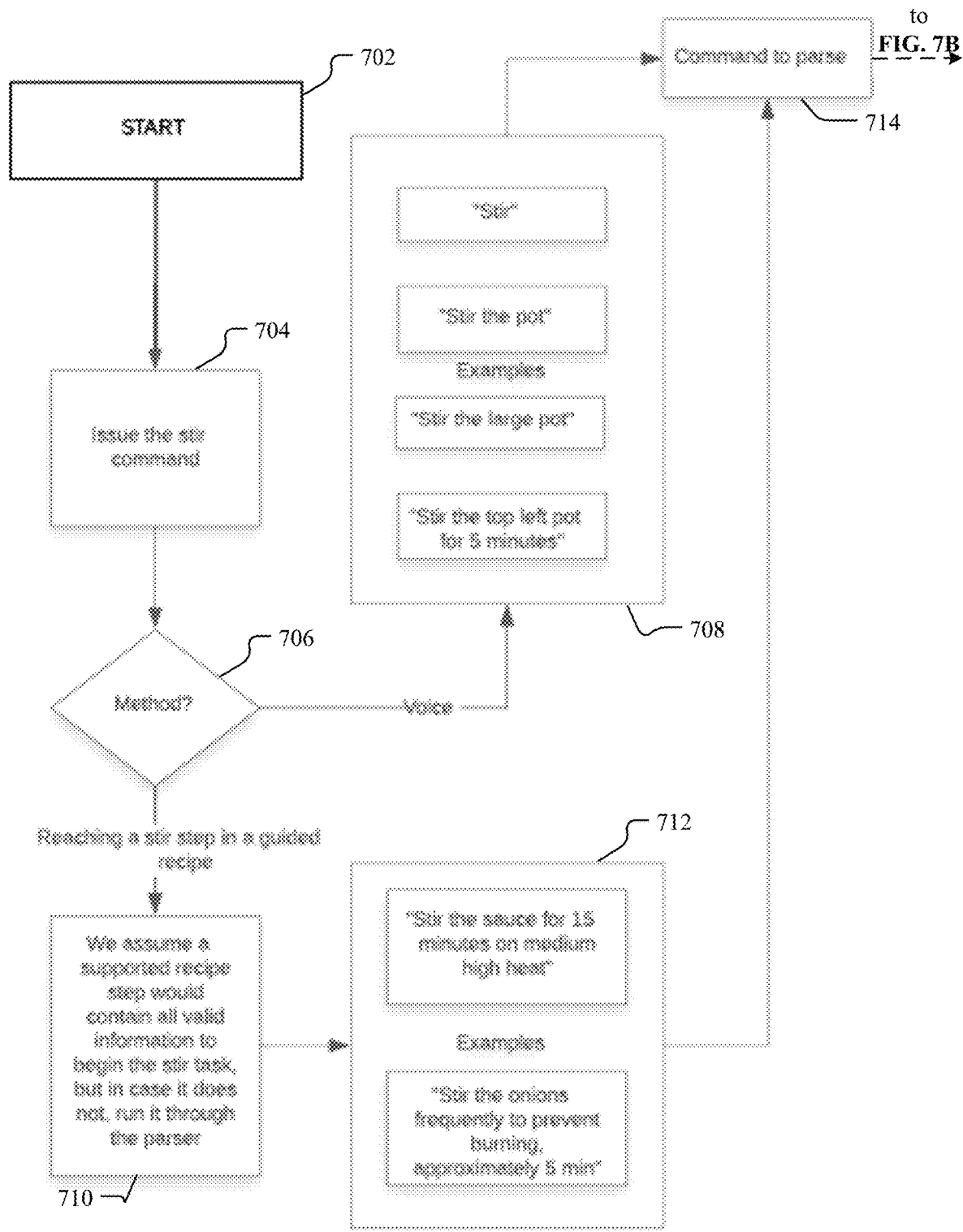
FIG. 7A illustrates the first part of an example flow chart for the stirring task with additional details.

FIGS. 7A-7D illustrates an example flow chart for the stirring task with additional details. Compared to FIGS. 6A-6B, FIGS. 7A-7D show the same specific stirring example, but with additional detail, including how the task may be triggered by a user. FIG. 7A illustrates the first part of an example flow chart for the stirring task with additional details. The process may start from step 702. At step 704, the user may issue the stir command. At step 706, the robotic system 100 may determine what method the user is using to issue the command. If the user is using voice, the example commands 708 may be "stir", "stir the pot", "stir the large pot", "stir the top left pot for 5 minutes", etc. If the user is reaching a stir step in a guided recipe, at step 710, the robotic system 100 may assume a supported recipe step would contain all valid information to begin the stir task, but in case it does not, the robotic system 100 may run it through the parser. The example recipe steps 712 may be "stir the sauce for 15 minutes on medium high heat" or "stir the onions frequently to prevent burning, approximately 5 minutes." No matter it is the user's voice command or a reached recipe step, the robotic system 100 may parse the command at step 714. The steps after step 714 is to be continued in FIG. 7B. Although this disclosure describes particular flow chart for particular tasks in a particular manner, this disclosure contemplates any suitable flow chart for any suitable task in any suitable manner.

Figure 7B:
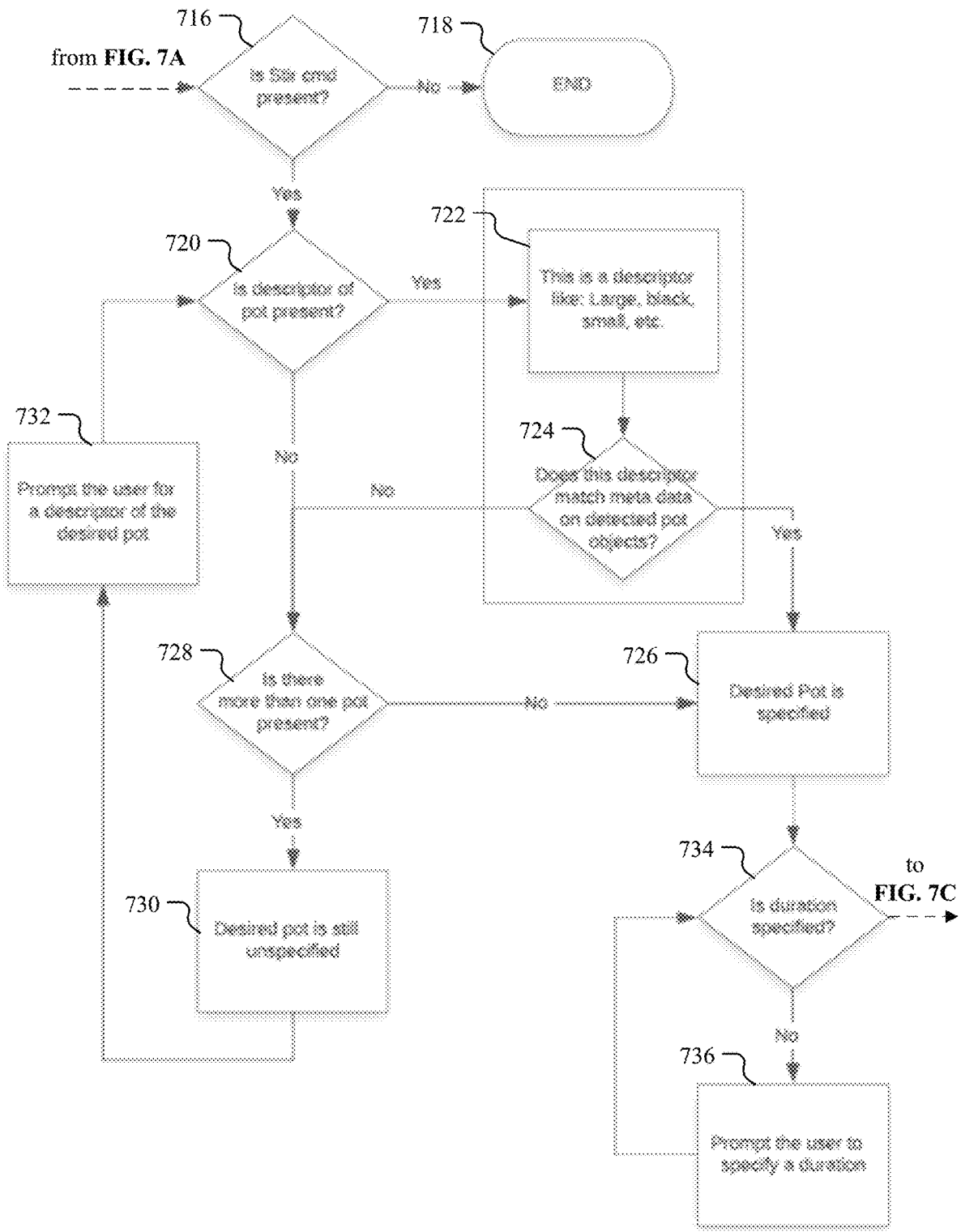
FIG. 7B illustrates the second part of an example flow chart for the stirring task with additional details.

FIG. 7B illustrates the second part of an example flow chart for the stirring task with additional details. After the command is parsed, the robotic system 100 may determine if the stir command is present at step 716. If the stir command is not present, the robotic system 100 may end the process at step 718. If the stir command is present, the robotic system 100 may determine if the descriptor of pot is present at step 720. If the descriptor is present, the robotic system 100 may determine, e.g., this is a descriptor like large, black, small, etc. at step 722. At step 724, the robotic system 100 may determine if this descriptor matches meta data on detected pot objects. If this descriptor matches meta data, the robotic system 100 may determine that the desired pot is specified at step 726. If this descriptor doesn't match meta data, the robotic system 100 may determine if there is more than one pot present at step 728. Going back to step 720, if the descriptor is not present, the robotic system 100 may also proceed to step 728. If there is more than one pot present, the robotic system 100 may determine that the desired pot is still unspecified at step 730. At step 732, the robotic system 100 may prompt the user for a descriptor of the desired pot. Continuing after step 726, the robotic system 100 may determine if the duration is specified at step 734. If the duration is not specified, the robotic system 100 may prompt the user to specify a duration at step 736. If the duration is specified, the robotic system 100 may proceed to next step, which is to be continued in FIG. 7C. Although this disclosure describes particular flow chart for particular tasks in a particular manner, this disclosure contemplates any suitable flow chart for any suitable task in any suitable manner.

Figure 7C:
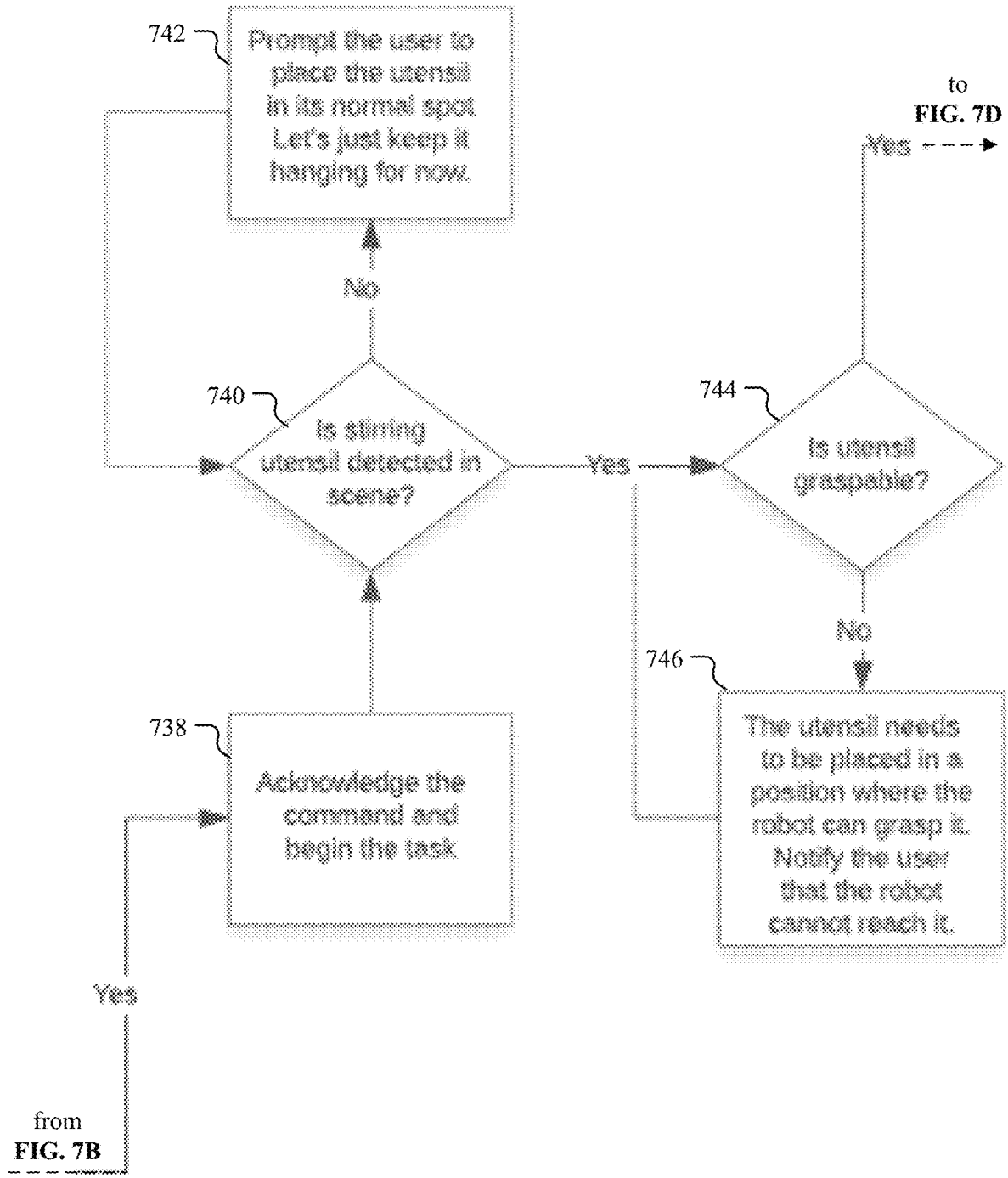
FIG. 7C illustrates the third part of an example flow chart for the stirring task with additional details.

FIG. 7C illustrates the third part of an example flow chart for the stirring task with additional details. If the duration is specified, the robotic system 100 may proceed to step 738, where the robotic system 100 may acknowledge the command and begin the task. At step 740, the robotic system 100 may determine if the stirring utensil is detected in scene. If the stirring utensil is not detected in scene, the robotic system 100 at step 742 may prompt the user to place the utensil in its normal spot, e.g., by saying "let's just keep it hanging for now." If the stirring utensil is detected in scene, the robotic system 100 may determine if the utensil is graspable at step 744. If the utensil is not graspable, at step 746, the robotic system 100 may notify the user that the robot cannot reach it as the utensil needs to be placed in a position where the robot can grasp it. After that, the robotic system 100 may repeat steps 744 and 746 until the utensil is graspable. If the utensil is graspable, the robotic system 100 may proceed to next step, which is to be continued in FIG. 7D. Although this disclosure describes particular flow chart for particular tasks in a particular manner, this disclosure contemplates any suitable flow chart for any suitable task in any suitable manner.

Figure 7D:
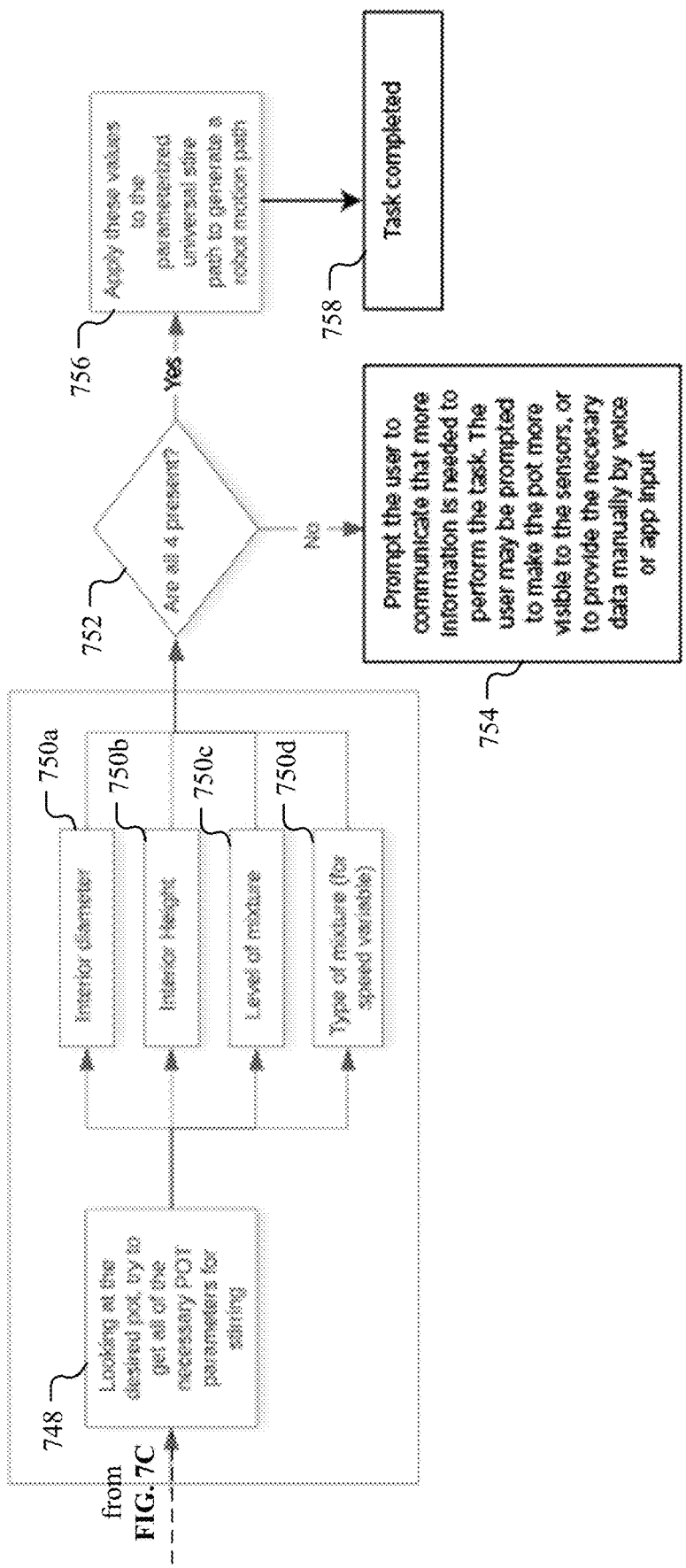
FIG. 7D illustrates the fourth part of an example flow chart for the stirring task with additional details.

FIG. 7D illustrates the fourth part of an example flow chart for the stirring task with additional details. If the utensil is graspable, the robotic system 100 may proceed to step 748, where the robotic system 100 may, looking at the desired pot, try to get all of the necessary pot parameters for stirring. As an example and not by way of limitation, the pot parameters may comprise interior diameter 750*a*, interior height 750*b*, level of mixture 750*c*, and type of mixture (for speed variable) 750*d*. At step 752, the robotic system 100 may determine if all these four pot parameters are present. If not all these four pot parameters are present, the robotic system 100 may prompt the user to communicate that more information is needed to perform the task at step 754. The user may be prompted to make the pot more visible to the sensors, or to provide the necessary data manually by voice or app input. If all these four pot parameters are present, the robotic system 100 may apply these values to the parameterized universal stir path to generate a robot motion path at step 756. The task may be then completed at step 758. Although this disclosure describes particular flow chart for particular tasks in a particular manner, this disclosure contemplates any suitable flow chart for any suitable task in any suitable manner.

Figure 8:
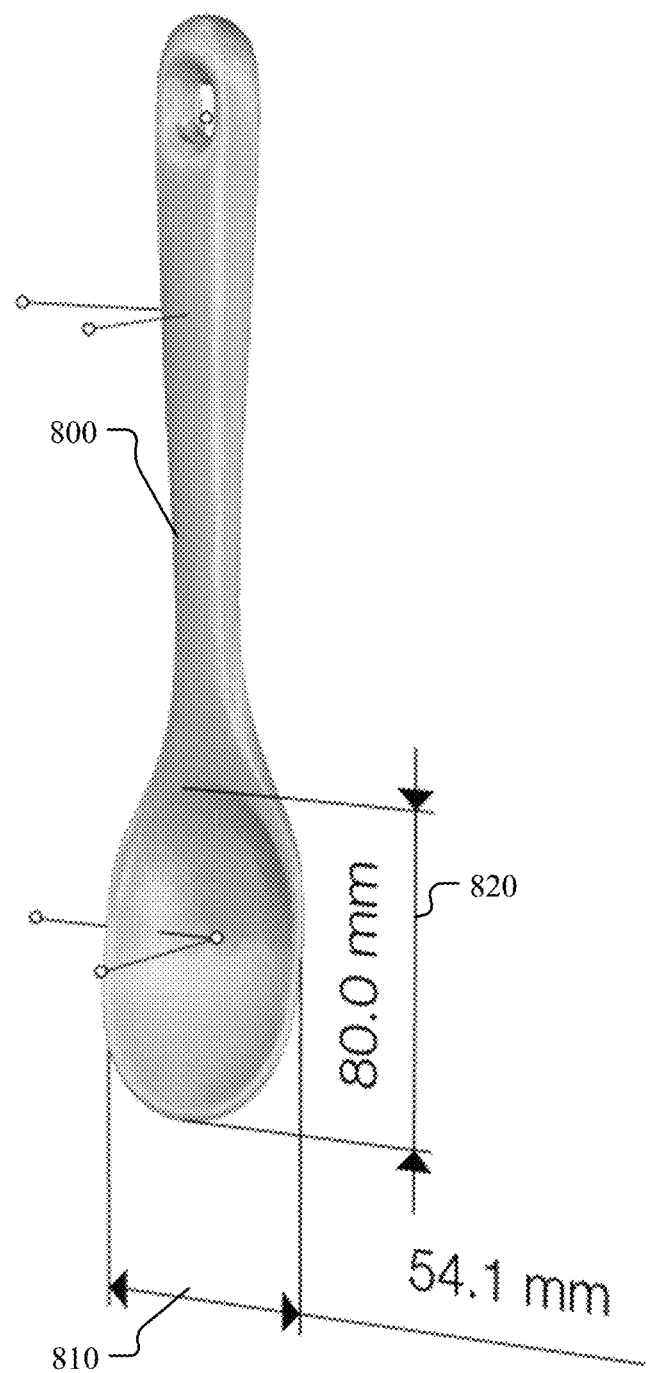
FIG. 8 illustrates an example spoon showing two important parameters (i.e., half-spoon width and spoon-height) that may affect the stirring path.
Figure 9:
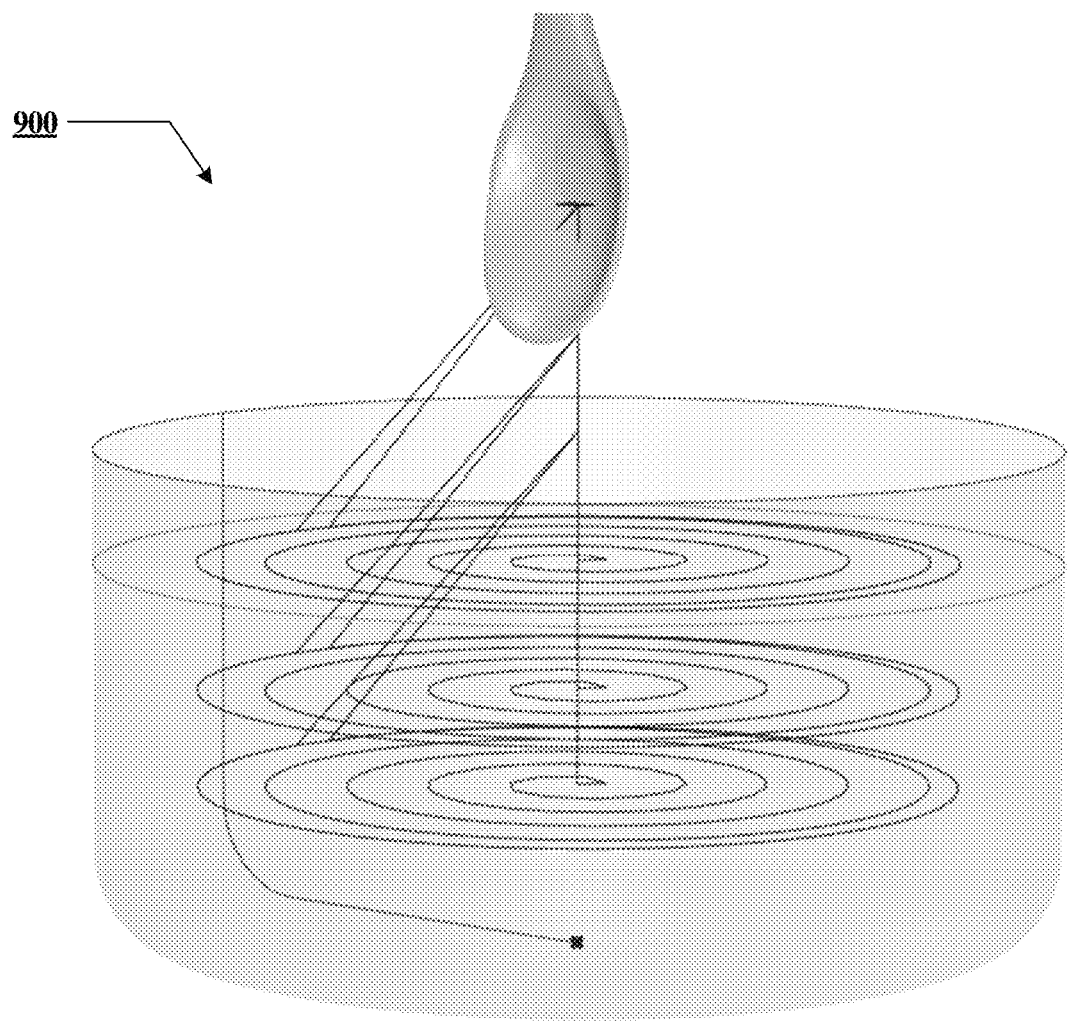
FIG. 9 illustrates an example trajectory showing the stirring of a pot at three different heights based on how much mixture/ingredients are in the pot as well as spoon width and height.

The detailed steps for dynamically updating trajectories responsive to object changes may be as follows based on the example of a robot arm stirring a pot of sauce in the kitchen. The first step may be the generation of an idealized stirring path. When creating stirring paths, the spoon dimensions may be important. As an example and not by way of limitation, trajectories may be designed in terms of "half-spoon widths" or "spoon-heights". FIG. 8 illustrates an example spoon 800 showing two important parameters (i.e., half-spoon width 810 and spoon-height 820) that may affect the stirring path. A larger spoon may require fewer stirs to affect the same amount of mixture/ingredients. FIG. 9 illustrates an example trajectory 900 showing the stirring of a pot at three different heights based on how much mixture/ingredients are in the pot as well as spoon width and height. Assume the robot is already holding a spoon in desired position. The robotic system 100 may first move to a generic stirring start pose. Then the robotic system 100 may move to pre-approach the pot to avoid clashing the pot edge. Then the robotic system 100 may approach the top-center of the pot opening. Then the robotic system 100 may move to the lowest allowed stir position depth within the pot. Then the robotic system 100 may stir in spiral outward until away from the side of the pan. As an example and not by way of limitation, the spiral may be based on a half-spoon width plus some safety margin. Then the robotic system 100 may make one revolution scraping sides of the pan with the spoon. The robotic system 100 may further move to the next stir height and repeat the above process (if the depth of the ingredient is sufficient). The robotic system 100 may repeat the above process until the specified duration is exceeded or the user commands the robotic system 100 to stop the stirring.

Figure 10:
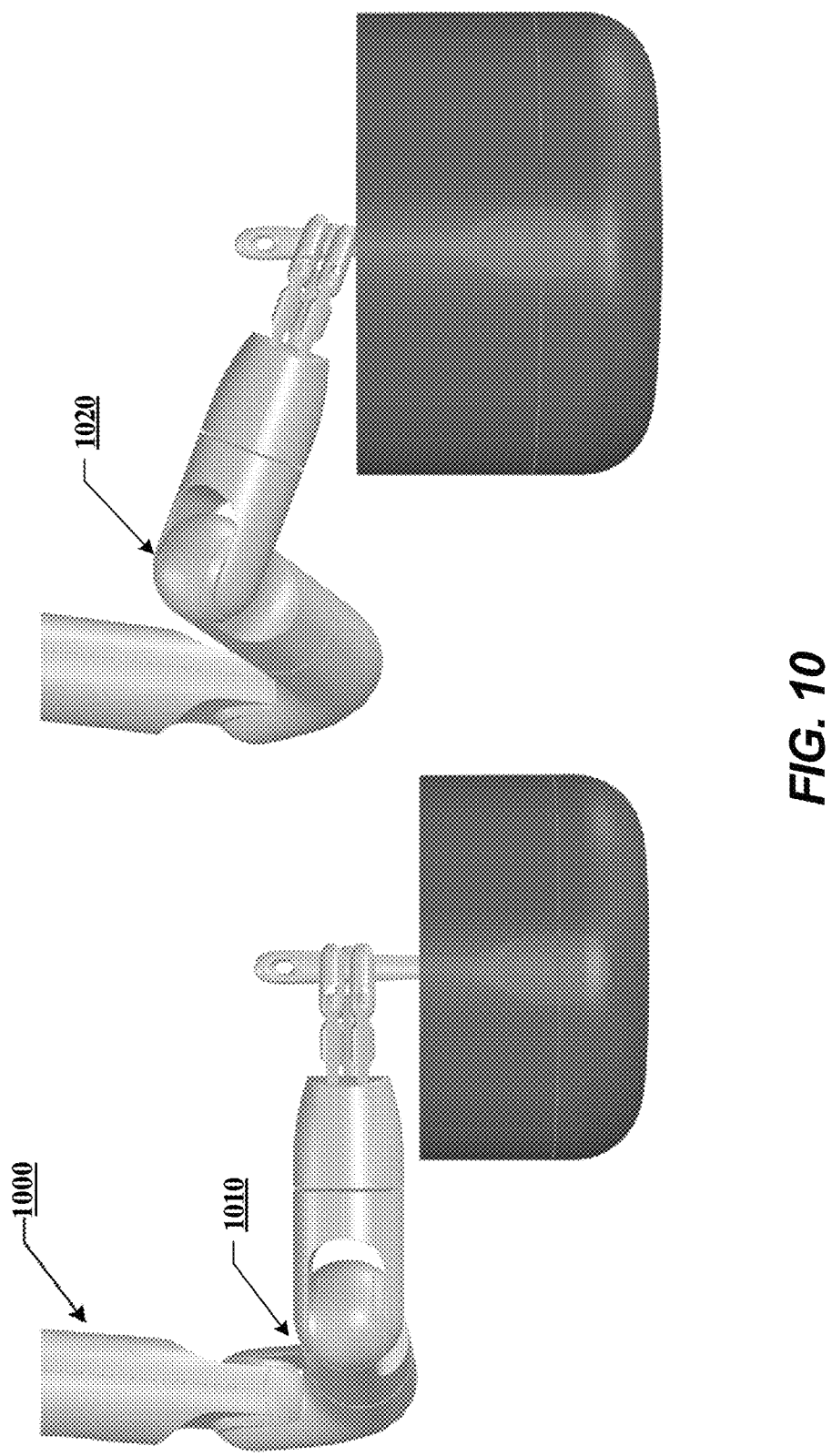
FIG. 10 illustrates an example of the need for parameterized trajectories.
Figure 11A:
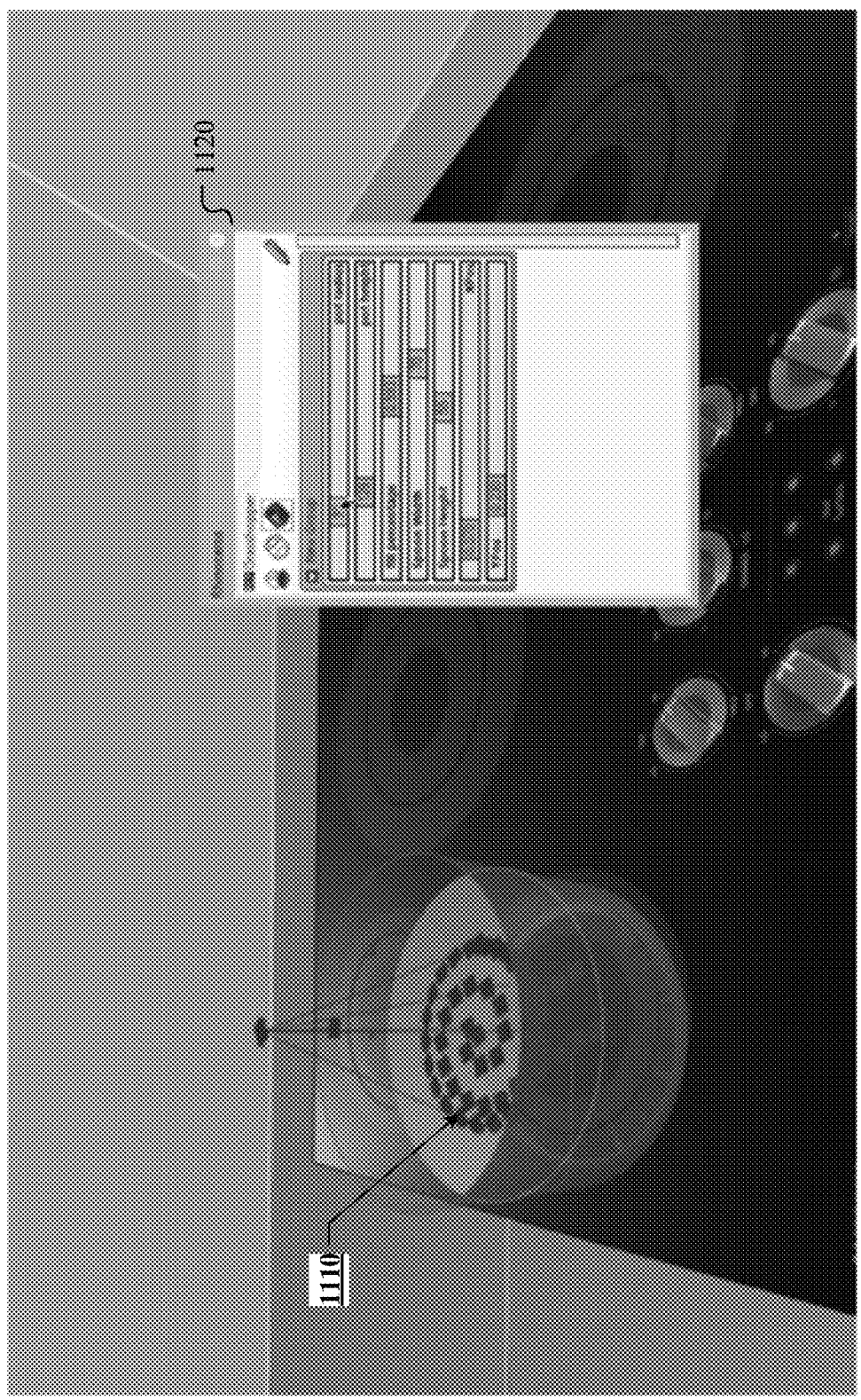
FIG. 11A illustrate an example showing that the trajectory with certain waypoints to be parametrically modified using the example user interface.
Figure 11B:
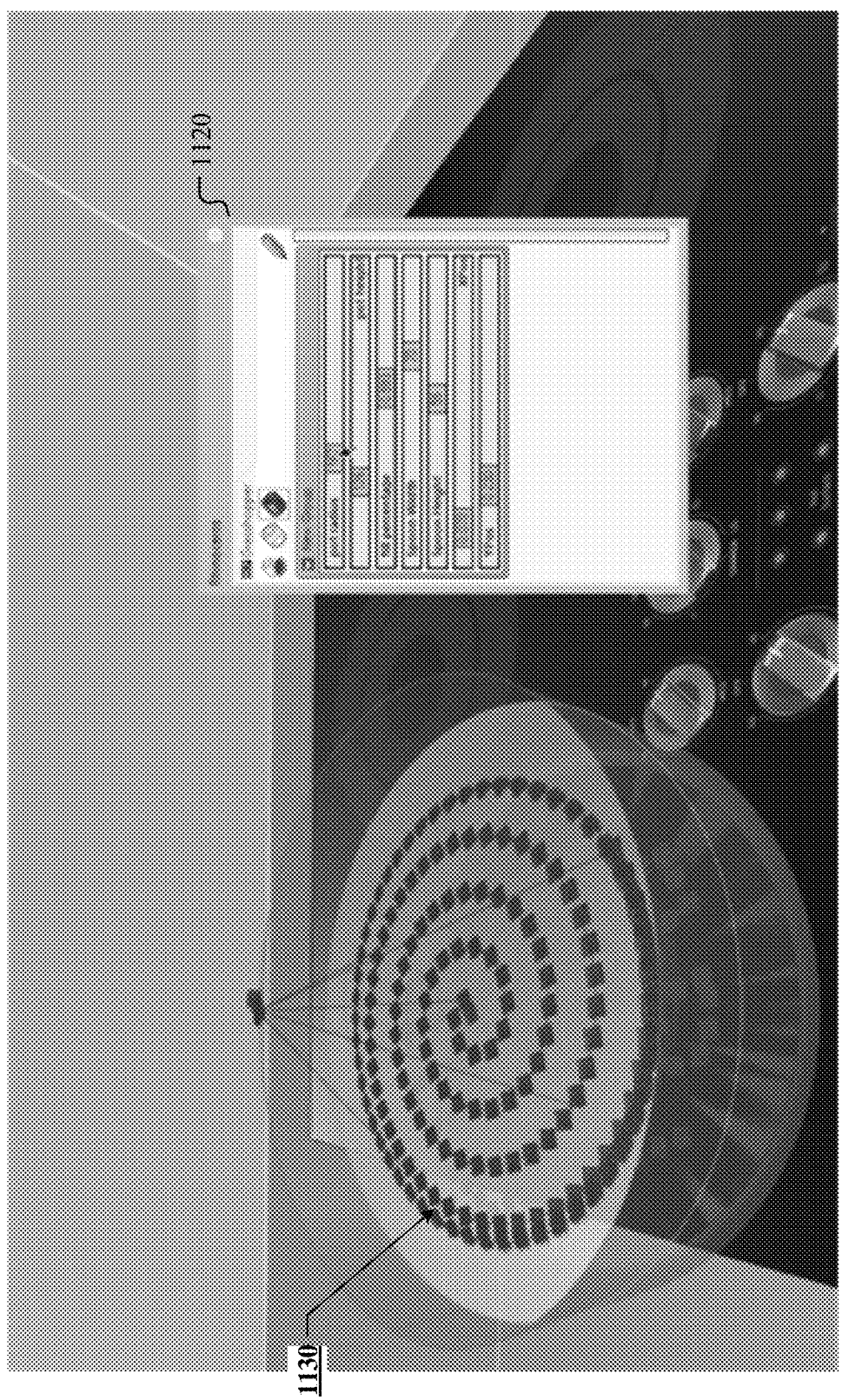
FIG. 11B illustrate an example showing that the modified trajectory with certain waypoints responsive to the parameter changes.

The second step may be the parameterization of the idealized stirring path. FIG. 10 illustrates an example of the need for parameterized trajectories. If the trajectory always assumes that the robot arm 1000 will grasp the spoon from a perpendicular approach 1010, the spoon may be unable to reach the bottoms of sufficiently large pots. However, if the height of the pot is taken into account and attached programmatically to the angle of approach 1020 for the spoon, this problem may be avoided. FIGS. 11A-11B illustrate an example showing that the trajectory has been designed with certain waypoints to be parametrically modified. FIG. 11A illustrate an example showing that the trajectory with certain waypoints 1110 to be parametrically modified using the example user interface 1120. FIG. 11B illustrate an example showing that the modified trajectory with certain waypoints 1130 responsive to the parameter changes. In particular embodiments, the position and orientation of each of these waypoints may have been defined relative to the properties of a specific object. When those object properties are observed to change, so too will the trajectory.

The third step may be determining which object in the environment should be used. As an example and not by way of limitation, FIG. 4 illustrates identification of words or instructions that can be parsed and matched with descriptors of the environment stored in the scene database. As an example and not by way of limitation, when the word "pan" is present, the robotic system 100 may know that the user is referring to either the pan on the left or the right, but not which one exactly. With the modifier of "small" or "large", the robotic system 100 may be able to use these words to look up the corresponding object property in the scene database (in this case diameter) and isolate the desired pan.

Figure 12:
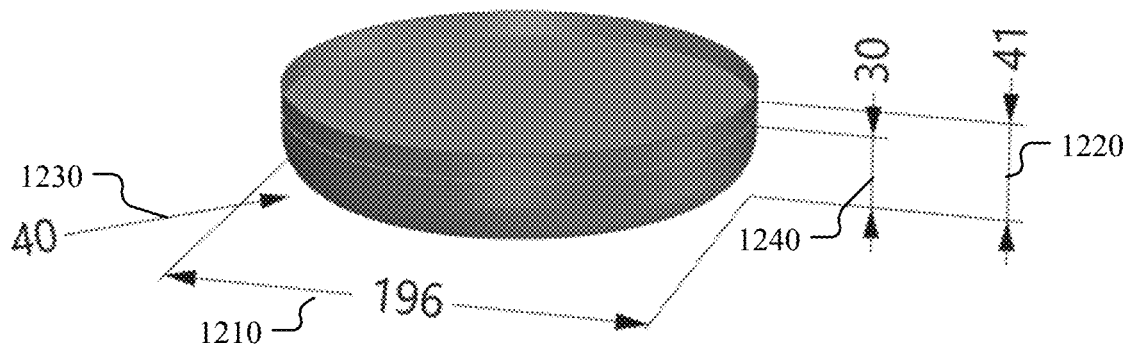
FIG. 12 illustrates example pertinent parameters that may affect the trajectory.

The fourth step may be querying attributes of the selected object for parameter generation. In particular embodiments, determining the one or more trajectory-parameters for the trajectory plan may comprise the following steps. The robotic system 100 may first compare the identified objects with the plurality of data entries in the scene database to identify one or more object IDs matching one or more of the identified objects in the environment. The robotic system 100 may then retrieve, from the scene database, one or more trajectory-parameters corresponding to the identified one or more object IDs. FIG. 12 illustrates example pertinent parameters that may affect the trajectory. There may be many parameters observed by the computer vision system and stored in the scene database. However, for this task it may have four pertinent parameters that will affect the trajectory, which are radius/diameter 1210, height 1220, fillet 1230 (at the bottom of the pot), and fill percentage 1240 (i.e., how full the pot is). In particular embodiments, the computer vision system may be used to observe the pot. An analysis may be performed on the observations to extract these parameters. There may be a variety of ways that these parameters can be measured in an environment using various sensors and imaging technology. As an example and not by way of limitation, determining the parameters may be as follows. The robotic system 100 may first use a depth sensor (RGB+D sensor) to observe the environment as a point cloud made up of colored points in the x-y-z space. The robotic system 100 may then use 3D point cloud segmentation algorithm to determine that there are multiple objects in the environment and retrieve the regions in which they exist. By looking in those regions, the robotic system 100 may use image classification (e.g., object detection) models to determine that one of these regions contains a pot. Once the robotic system 100 knows that an object is a pot, a bounding box of the object is in space, and color data from the pixels that make up this object is available, the robotic system 100 may infer: 1) the height of the object by the height of the bounding box, 2) the diameter of the pot by the x or y dimension of the bounding box, and 3) other qualitative data like what color the pot is.

Figure 13B:
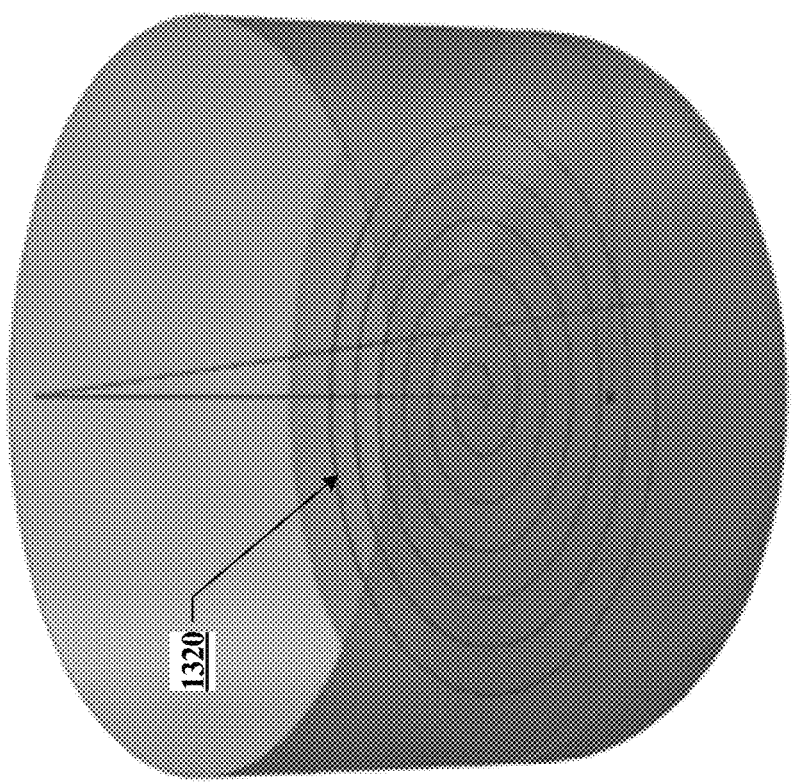
FIG. 13B illustrate an example stirring trajectory based on a second fill percentage.
Figure 13A:
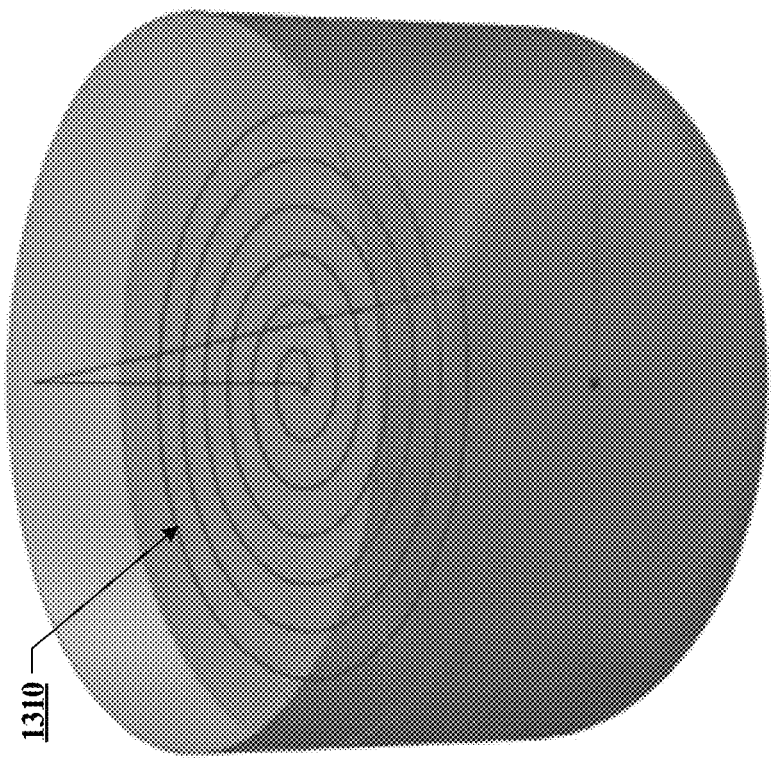
FIG. 13A illustrate an example stirring trajectory based on a first fill percentage.
Figure 13D:
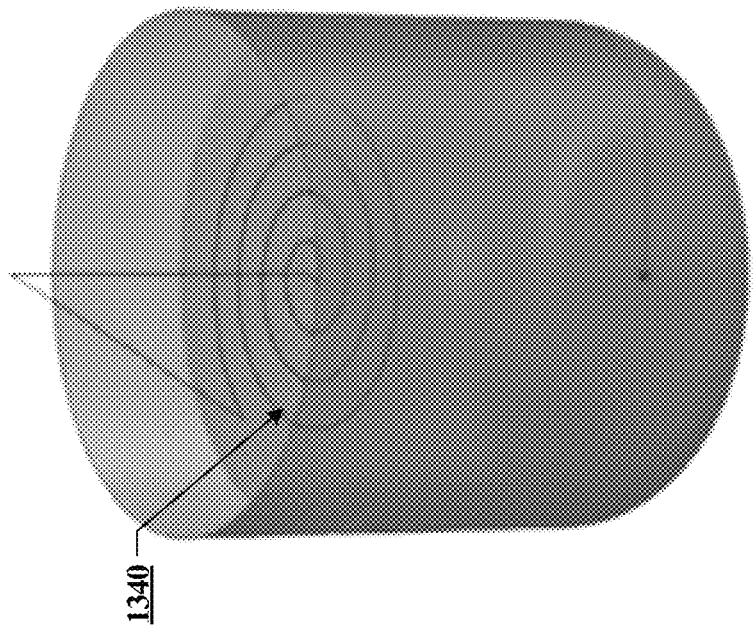
FIG. 13D illustrate an example stirring trajectory based on a second pot radius.
Figure 13C:
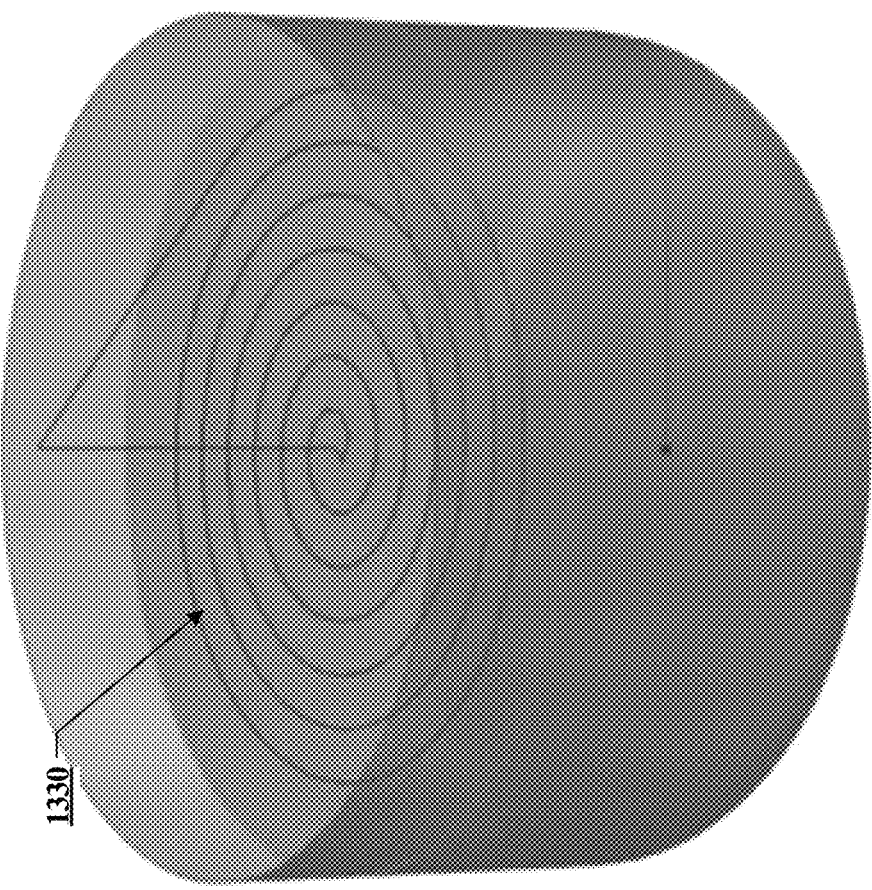
FIG. 13C illustrate an example stirring trajectory based on a first pot radius.

The fifth step may be modifying trajectory parameters based on extracted attribute data. Once the appropriate parameters are present in the scene database, they may be applied to the trajectory generator. FIGS. 13A-13D illustrate example affections of the stirring trajectory based on changing parameters. FIG. 13A illustrate an example stirring trajectory 1310 based on a first fill percentage. FIG. 13B illustrate an example stirring trajectory 1320 based on a second fill percentage. FIG. 13C illustrate an example stirring trajectory 1330 based on a first pot radius. FIG. 13D illustrate an example stirring trajectory 1340 based on a second pot radius.

The sixth step may be attaching the newly modified (i.e., geometrically transformed) trajectory to the parent object. As such, if its attributes change over time, the trajectory may be also updated over time. As an example and not by way of limitation, even if the pot was originally located on one of the burners on the left, the trajectory may be updated to match the new position of the pot at the center burner provided that the new location of the pot is within reach, i.e., that all of the new scene database attributes associated with the pot are still within the allowed ranges defined by the original trajectory. The seventh step may be the execution of the task. Given that all of the previous steps have been completed, the robot system 100 may now complete the task.

Figure 14:
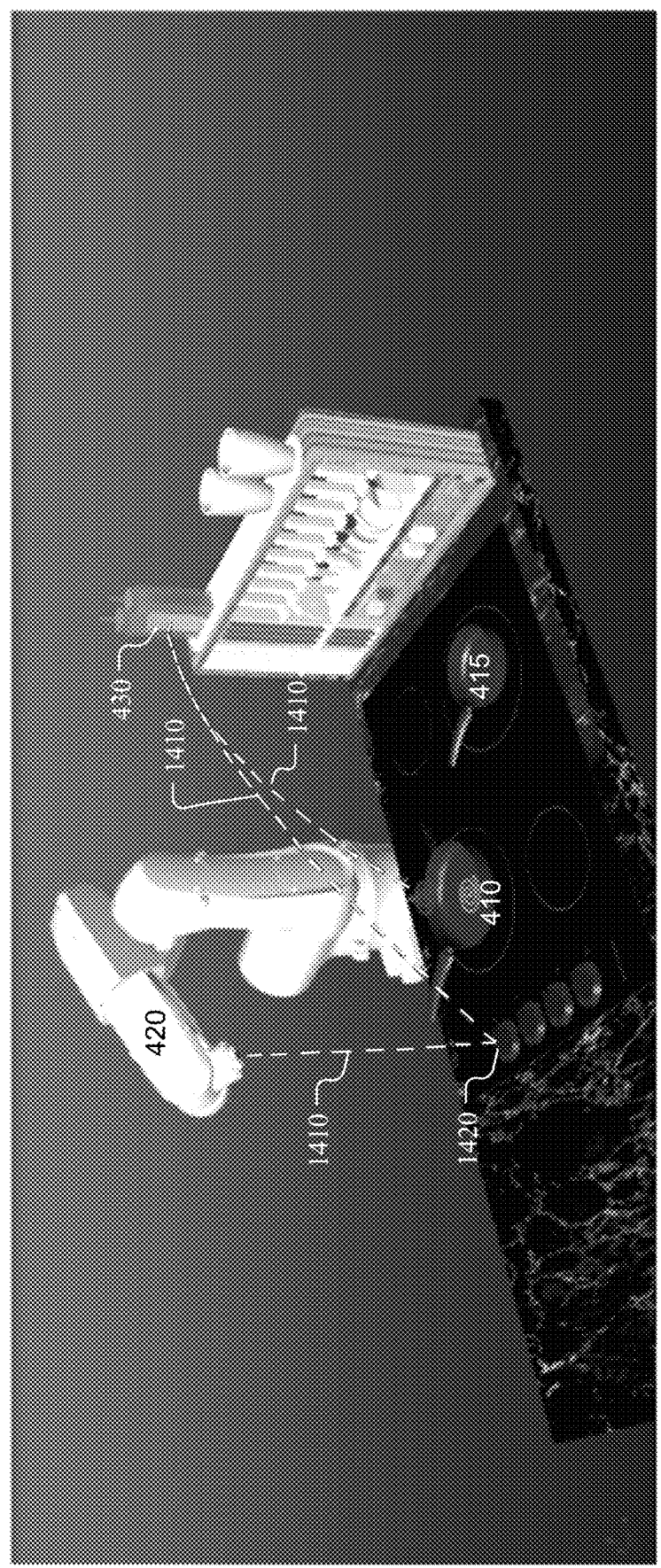
FIG. 14 illustrates example attachments of trajectories to different objects after detaching and reparenting.

The final step may be detaching and reparenting the trajectory to a new object as requested by the user or otherwise determined by the robotic system 100. While the robotic system 100 is trying to determine which object should be acted upon, if the user decides that they want to act upon a new object, or the task that the user originally requested the robot device to do actually contained instructions to stir more than one pot, the robotic system 100 may need to detach the trajectory from the first pot and attach and adjust it to the second pot. The purpose may be that the new parameters of the new pot are propagated through the trajectory generator. FIG. 14 illustrates example attachments of trajectories to different objects after detaching and reparenting. The illustration in FIG. 14 may correspond to the scenario in FIG. 4. As can be seen, the command 405 now may be changed to "heat up ¼ cup oil in large pan." Therefore, the robotic system 100 may detach the trajectory 425 from previously desired objects (e.g., the small pan 415) and reparent it to the large pan 410. As illustrated in FIG. 14, the robot arm 420 may now follow the modified trajectory 1410 with modified parameters to fetch oil 430, pour it into the large pan 410, and then turn on another corresponding stove turner 1420.

Continuing with the stirring example, the embodiments disclosed herein may be evaluated as follows. Generally speaking, the following criteria may need to be taken into account in order to stir well. There may be three reasons to stir. i.e., to create a homogenous mixture, to evenly disperse temperature, and to alter the viscosity of a liquid (thicker or thinner). To stir well, one may need to make sure that the utensil one's stirring with touches the bottom of the pan when stirring liquids overheat. One may need to take care to touch the corners as well. For thin liquids without any solids mixed with it, stirring in the middle of the pot or pan may be good enough.

Figure 15:
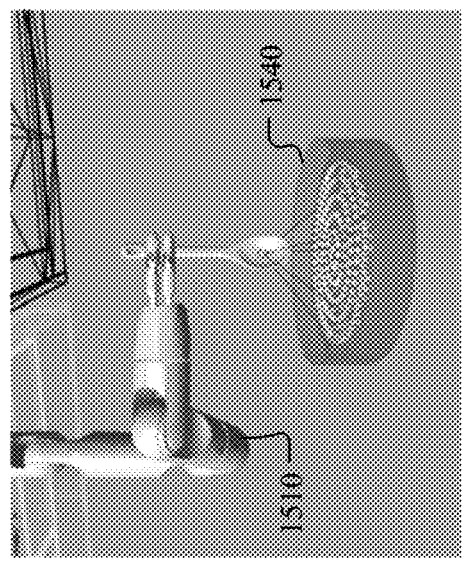
FIG. 15 illustrates an example stirring adaptive to any sized pot based on the embodiments disclosed herein.
Figure 15:
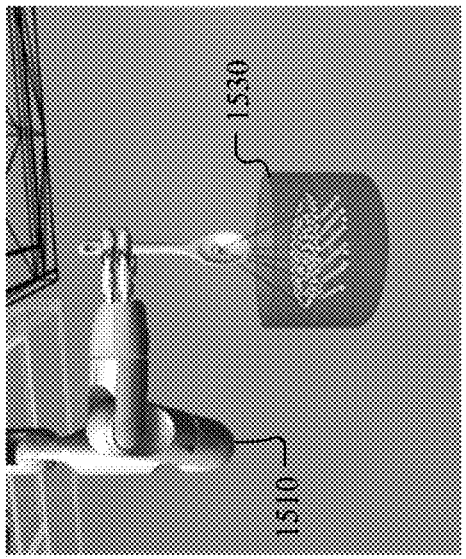
Figure 15:
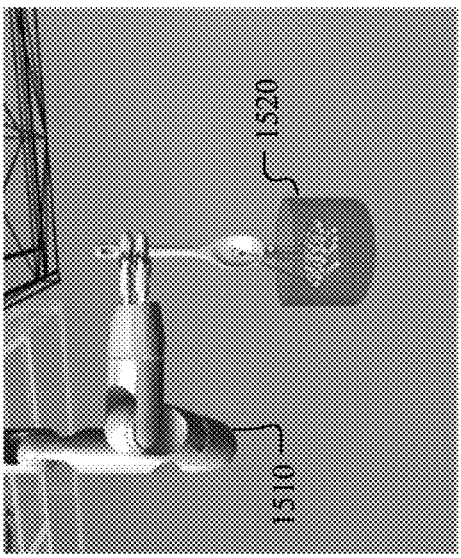

In order to stir well, the spoon may need to touch the entire volume of the ingredients in the pot, including the sides and the bottom of the pot. The embodiments disclosed herein may ensure that that is always the case. By applying the parameters of the pot to the trajectory, the robotic system may ensure that 1) the entire pot surface is touched or scraped to avoid burning, 2) the mixture is made homogenous by stirring in the center of the pot, and 3) the entire volume of the pot becomes inhabited by the spoon even when pots of varying sizes are encountered by the robotic system. By taking into account these pot parameters, the same exact trajectory may be adapted to work in any sized pot without the need to reprogram the robot motion. FIG. 15 illustrates an example stirring adaptive to any sized pot based on the embodiments disclosed herein. As can be seen, the robotic system 100 may initially generate a trajectory designed for a small pot 1520 for the robot arm 1510 to stir. Once the pot changes to a medium pot 1530, the robotic system 100 may modify the trajectory for the robot arm 1510 to stir the medium pot 1530 without any problem. If the pot is further changed to a large pot 1540, the robotic system 100 may further modify the trajectory for the robot arm 1510 to stir the large pot 1540 without any problem.

Figure 16:
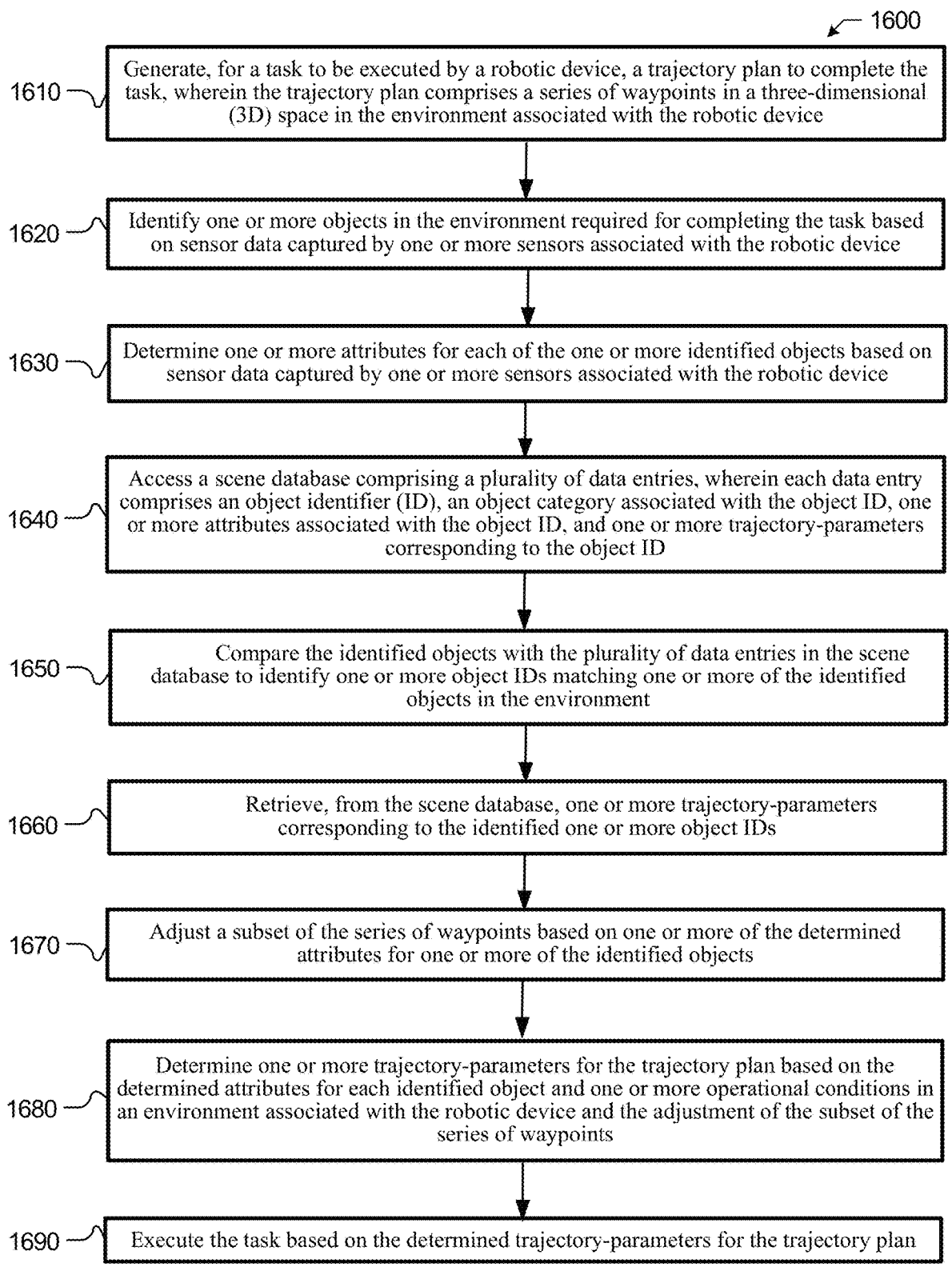
FIG. 16 illustrates an example method for dynamically updating trajectories responsive to object changes.

FIG. 16 illustrates is a flow diagram of a method for dynamically updating trajectories responsive to object changes, in accordance with the presently disclosed embodiments. The method 1600 may be performed utilizing one or more processing devices (e.g., a robotic system 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 1600 may begin at step 1610 with the one or more processing devices (e.g., the robotic system 100). For example, in particular embodiments, the robotic system may generate, for a task to be executed by a robotic system, a trajectory plan to complete the task, wherein the trajectory plan comprises a series of waypoints in a three-dimensional (3D) space in the environment associated with the robotic system. The method 1600 may then continue at step 1620 with the one or more processing devices (e.g., the robotic system 100). For example, in particular embodiments, the robotic system may identify one or more objects in the environment required for completing the task based on sensor data captured by one or more sensors associated with the robotic system. The method 1600 may then continue at step 1630 with the one or more processing devices (e.g., the robotic system 100). For example, in particular embodiments, the robotic system may determine one or more attributes for each of the one or more identified objects based on sensor data captured by one or more sensors associated with the robotic system. The method 1600 may then continue at block 1640 with the one or more processing devices (e.g., the robotic system 100). For example, in particular embodiments, the robotic system may access a scene database comprising a plurality of data entries, wherein each data entry comprises an object identifier (ID), an object category associated with the object ID, one or more attributes associated with the object ID, and one or more trajectory-parameters corresponding to the object ID. The method 1600 may then continue at step 1650 with the one or more processing devices (e.g., the robotic system 100). For example, in particular embodiments, the robotic system may compare the identified objects with the plurality of data entries in the scene database to identify one or more object IDs matching one or more of the identified objects in the environment. The method 1600 may then continue at step 1660 with the one or more processing devices (e.g., the robotic system 100). For example, in particular embodiments, the robotic system may retrieve, from the scene database, one or more trajectory-parameters corresponding to the identified one or more object IDs. The method 1600 may then continue at step 1670 with the one or more processing devices (e.g., the robotic system 100). For example, in particular embodiments, the robotic system may adjust a subset of the series of waypoints based on one or more of the determined attributes for one or more of the identified objects. The method 1600 may then continue at step 1680 with the one or more processing devices (e.g., the robotic system 100). For example, in particular embodiments, the robotic system may determine one or more trajectory-parameters for the trajectory plan based on the determined attributes for each identified object and one or more operational conditions in an environment associated with the robotic system and the adjustment of the subset of the series of waypoints. The method 1600 may then continue at step 1690 with the one or more processing devices (e.g., the robotic system 100). For example, in particular embodiments, the robotic system may execute the task based on the determined trajectory-parameters for the trajectory plan. Particular embodiments may repeat one or more steps of the method of FIG. 16, where appropriate. Although this disclosure describes and illustrates particular steps of the method of FIG. 16 as occurring in a particular order, this disclosure contemplates any suitable steps of the method of FIG. 16 occurring in any suitable order. Moreover, although this disclosure describes and illustrates an example method for dynamically updating trajectories responsive to object changes including the particular steps of the method of FIG. 16, this disclosure contemplates any suitable method for dynamically updating trajectories responsive to object changes including any suitable steps, which may include all, some, or none of the steps of the method of FIG. 16, where appropriate. Furthermore, although this disclosure describes and illustrates particular components, devices, or systems carrying out particular steps of the method of FIG. 16, this disclosure contemplates any suitable combination of any suitable components, devices, or systems carrying out any suitable steps of the method of FIG. 16.

Systems and Methods

Figure 17:
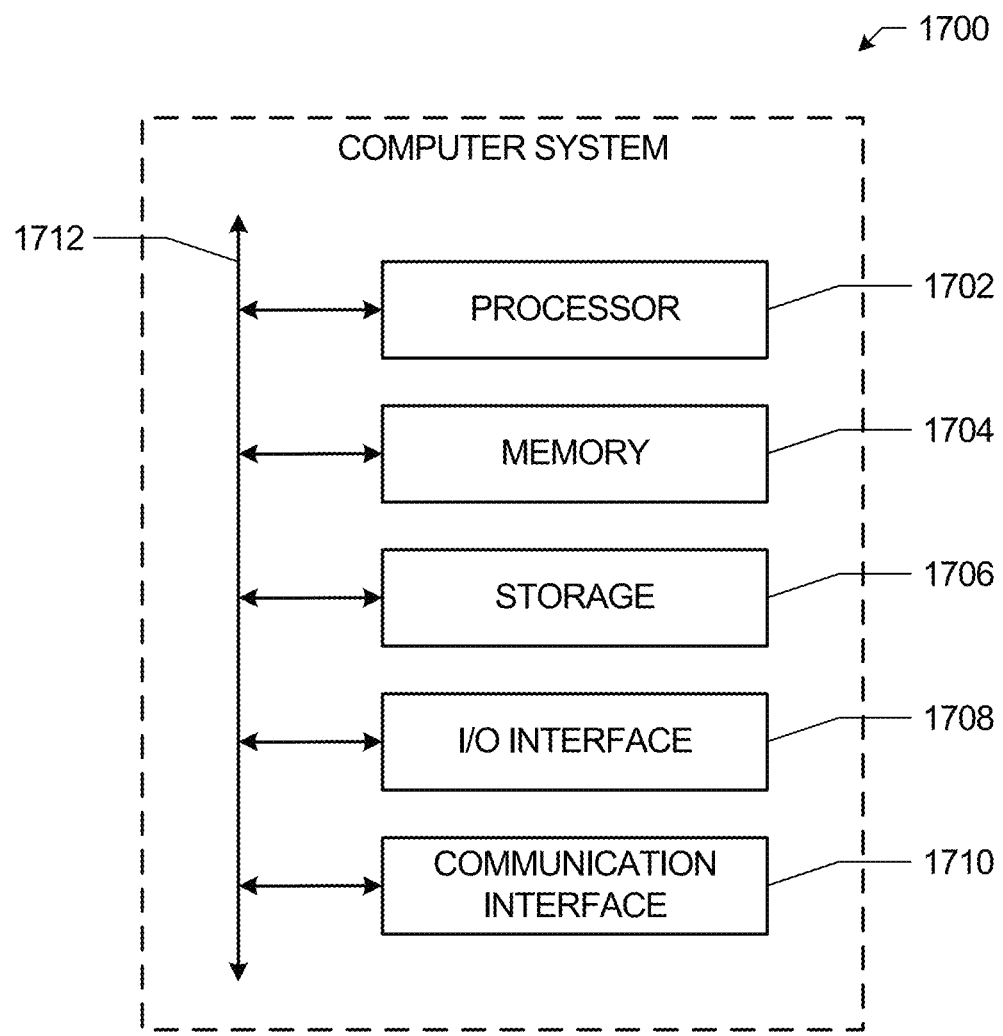
FIG. 17 illustrates an example computer system.

FIG. 17 illustrates an example computer system 1700 that may be utilized to dynamically update trajectories responsive to object changes, in accordance with the presently disclosed embodiments. In particular embodiments, one or more computer systems 1700 perform one or more steps of one or more methods described or illustrated herein. In particular embodiments, one or more computer systems 1700 provide functionality described or illustrated herein. In particular embodiments, software running on one or more computer systems 1700 performs one or more steps of one or more methods described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks.

Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1702, memory 1704, storage 1706, an input/output (I/O) interface 1708, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement. In particular embodiments, processor 1702 includes hardware for executing instructions, such as those making up a computer program. As an example, and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example, and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702.

Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706; or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example, and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere).

One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memory devices 1704, where appropriate. Although this disclosure describes and illustrates particular memory, this disclosure contemplates any suitable memory.

In particular embodiments, storage 1706 includes mass storage for data or instructions. As an example, and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1706 for them. Where appropriate, I/O interface 1708 may include one or more device or software drivers enabling processor 1702 to drive one or more of these I/O devices. I/O interface 1708 may include one or more I/O interfaces 1706, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example, and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1710 for it.

As an example, and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example, and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

AI Architecture

Figure 18:
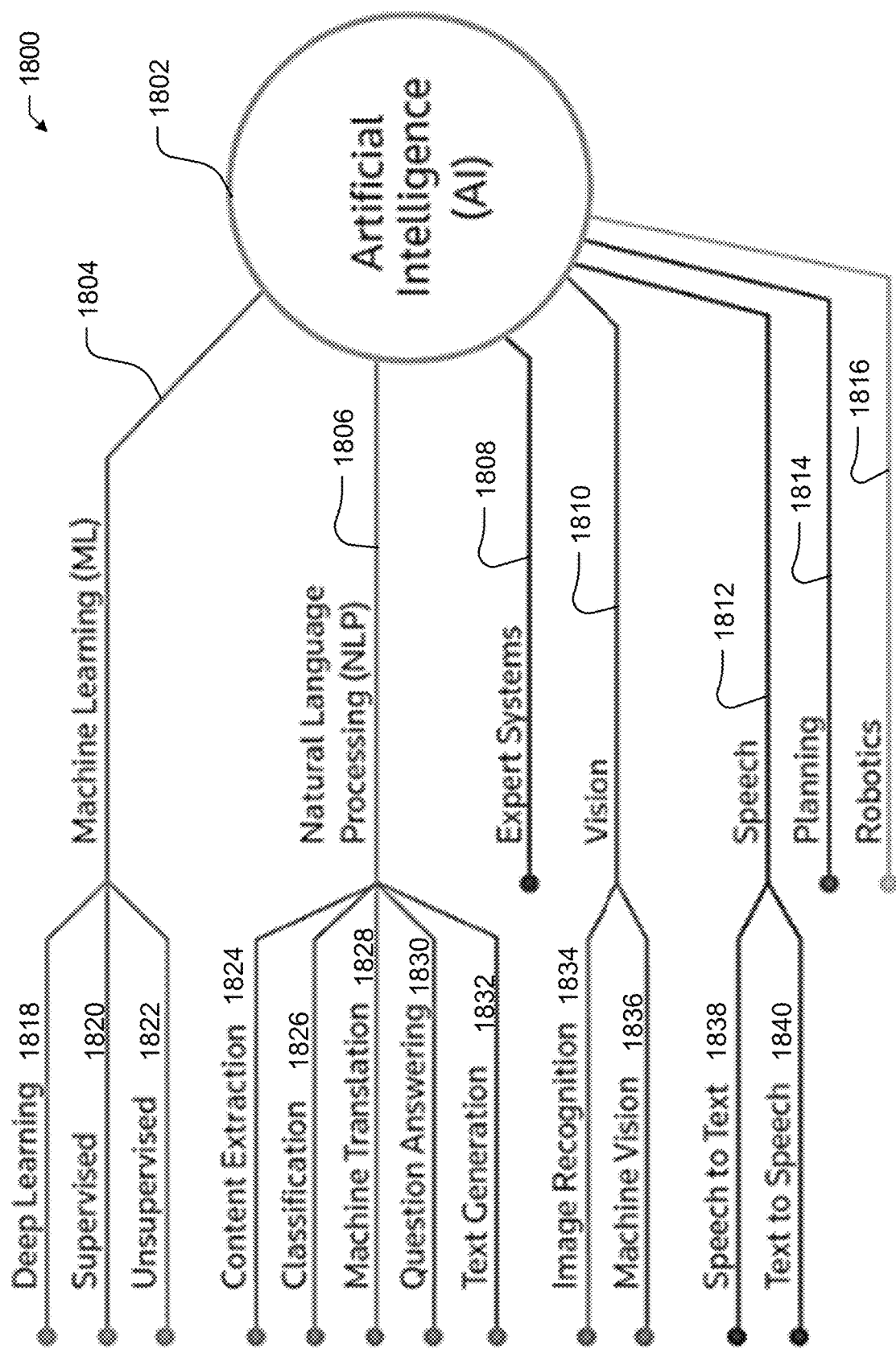
FIG. 18 illustrates a diagram of an example artificial intelligence (AI) architecture.

FIG. 18 illustrates a diagram 1800 of an example artificial intelligence (AI) architecture 1802 that may be utilized to dynamically update trajectories responsive to object changes, in accordance with the presently disclosed embodiments. In particular embodiments, the AI architecture 1802 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 18, the AI architecture 1802 may include machine leaning (ML) algorithms and functions 1804, natural language processing (NLP) algorithms and functions 1806, expert systems 1808, computer-based vision algorithms and functions 1810, speech recognition algorithms and functions 1812, planning algorithms and functions 1814, and robotics algorithms and functions 1816. In particular embodiments, the ML algorithms and functions 1804 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 1804 may include deep learning algorithms 1818, supervised learning algorithms 1820, and unsupervised learning algorithms 1822.

In particular embodiments, the deep learning algorithms 1818 may include any artificial neural networks (ANNs) that may be utilized to learn deep levels of representations and abstractions from large amounts of data. For example, the deep learning algorithms 1818 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 1820 may include any algorithms that may be utilized to apply, for example, what has been learned in the past to new data using labeled examples for predicting future events. For example, starting from the analysis of a known training dataset, the supervised learning algorithms 1820 may produce an inferred function to make predictions about the output values. The supervised learning algorithms 1820 can also compare its output with the correct and intended output and find errors in order to modify the supervised learning algorithms 1820 accordingly. On the other hand, the unsupervised learning algorithms 1822 may include any algorithms that may applied, for example, when the data used to train the unsupervised learning algorithms 1822 are neither classified or labeled. For example, the unsupervised learning algorithms 1822 may study and analyze how systems may infer a function to describe a hidden structure from unlabeled data.

In particular embodiments, the NLP algorithms and functions 1806 may include any algorithms or functions that may be suitable for automatically manipulating natural language, such as speech and/or text. For example, in particular embodiments, the NLP algorithms and functions 1806 may include content extraction algorithms or functions 1824, classification algorithms or functions 1826, machine translation algorithms or functions 1828, question answering (QA) algorithms or functions 1830, and text generation algorithms or functions 1832. In particular embodiments, the content extraction algorithms or functions 1824 may include a means for extracting text or images from electronic documents (e.g., webpages, text editor documents, and so forth) to be utilized, for example, in other applications.

In particular embodiments, the classification algorithms or functions 1826 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 1828 may include any algorithms or functions that may be suitable for automatically converting source text in one language, for example, into text in another language. The QA algorithms or functions 1830 may include any algorithms or functions that may be suitable for automatically answering questions posed by humans in, for example, a natural language, such as that performed by voice-controlled personal assistant devices. The text generation algorithms or functions 1832 may include any algorithms or functions that may be suitable for automatically generating natural language texts.

In particular embodiments, the expert systems 1808 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 1810 may include any algorithms or functions that may be suitable for automatically extracting information from images (e.g., photo images, video images). For example, the computer-based vision algorithms and functions 1810 may include image recognition algorithms 1834 and machine vision algorithms 1836. The image recognition algorithms 1834 may include any algorithms that may be suitable for automatically identifying and/or classifying objects, places, people, and so forth that may be included in, for example, one or more image frames or other displayed data. The machine vision algorithms 1836 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 1812 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 1814 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 1816 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a robotic system:
   accessing a natural-language input regarding a task to be executed by the robotic system;
   determining a semantic meaning of the natural-language input to identify, from the natural-language input, (1) the task and (2) one or more objects for the robotic system to use to complete the task;
   generating, for the task to be executed by the robotic system, a trajectory plan to complete the task by selecting a predetermined, parameterized trajectory based on the identified task, wherein the parameterized trajectory comprises at least one group of waypoints for which modifications apply collectively to the waypoints in the group, and wherein the parameterized trajectory is associated with one or more changeable trajectory parameters, each changeable trajectory parameter associated with a predetermined allowable value range;
   identifying one or more objects in an environment of robotic system that correspond to the one or more objects identified from the natural-language input to use for completing the task;
   identifying, for each of the one or more objects, an object type from a set of a plurality of predetermined object types, wherein each object type is distinct from a shape;
   determining, for each of the one or more objects and based on the respective identified object type, one or more predetermined trajectory-influencing attributes of the respective identified object type, wherein the one or more predetermined trajectory-influencing attributes comprises one or more of an object size, an object shape, an object color, an object texture, and an object orientation;
   determining, for each of the one or more objects, whether each of the changeable trajectory parameters corresponds to at least one determined trajectory-influencing attribute;
   determining, for each of the one or more objects, a respective object-specific value for each of the one or more predetermined trajectory-influencing attributes;
   determining, for each of the one or more objects, whether each object-specific value is within the predetermined allowable value range associated with the corresponding changeable trajectory parameter;
   in response to a determination that (1) each changeable trajectory parameter corresponds to at least one determined trajectory-influencing attribute and (2) each object-specific value is within the predetermined allowable value range associated with the corresponding changeable trajectory parameter, then updating the trajectory plan by applying the same transformation to each waypoint of one or more of the at least one group of waypoints of the selected predetermined, parameterized trajectory, wherein the transformation is based on the object-specific values for the one or more predetermined trajectory-influencing attributes; and
   executing the task based on the updated trajectory plan.

2. The method of claim 1, wherein the at least one group of waypoints are a subset of a series of waypoints in a three-dimensional (3D) space in the environment associated with the robotic system.

3. The method of claim 2, wherein updating the trajectory plan based on the object-specific values for the one or more predetermined trajectory-influencing attributes comprises one or more of: scaling the subset of waypoints, rotating the subset of waypoints, or moving the subset of waypoints.

4. The method of claim 1, wherein the one or more objects are identified based on sensor data captured by one or more sensors associated with the robotic system.

5. The method of claim 1, wherein one or more of the object-specific values are determined based on sensor data captured by one or more sensors associated with the robotic system.

6. The method of claim 1, further comprising:
accessing a scene database comprising a plurality of data entries, wherein each data entry comprises an object identifier (ID), an object type associated with the object ID, and the one or more predetermined trajectory-influencing attributes associated with that object type.

7. The method of claim 6, wherein determining, for each of the one or more objects and based on the respective identified object type, one or more predetermined trajectory-influencing attributes of the respective identified object comprises:
comparing the one or more objects with the plurality of data entries in the scene database to identify one or more object IDs matching one or more of the one or more objects; and
retrieving, from the scene database, the one or more predetermined trajectory-influencing attributes corresponding to the identified one or more object IDs.

8. A robotic system comprising:
a computing system with control software;
a robot controller;
one or more robotic limbs;
one or more non-transitory computer-readable storage media including instructions; and
one or more processors coupled to the storage media, the one or more processors configured to execute the instructions to:
access a natural-language input regarding a task to be executed by the robotic system;
determine a semantic meaning of the natural-language input to identify, from the natural-language input, (1) the task and (2) one or more objects for the robotic system to use to complete the task;
generate, for the task to be executed by the robotic system, a trajectory plan to complete the task by selecting a predetermined, parameterized trajectory based on the identified task, wherein the parameterized trajectory comprises at least one group of waypoints for which modifications apply collectively to the waypoints in the group, and wherein the parameterized trajectory is associated with one or more changeable trajectory parameters, each changeable trajectory parameter associated with a predetermined allowable value range;
identify one or more objects in an environment of the robotic system that correspond to the one or more objects identified from the natural-language input to use for completing the task;
identify, for each of the one or more objects, an object type from a set of a plurality of predetermined object types, wherein each object type is distinct from a shape;
determine, for each of the one or more objects and based on the respective identified object type, one or more predetermined trajectory-influencing attributes of the respective identified object type, wherein the one or more predetermined trajectory-influencing attributes comprises one or more of an object size, an object shape, an object color, an object texture, and an object orientation;
determine, for each of the one or more objects, whether each of the changeable trajectory parameters corresponds to at least one determined trajectory-influencing attribute;
determine, for each of the one or more objects, a respective object-specific value for each of the one or more predetermined trajectory-influencing attributes;
determine, for each of the one or more objects, whether each object-specific value is within the predetermined allowable value range associated with the corresponding changeable trajectory parameter;
in response to a determination that (1) each changeable trajectory parameter corresponds to at least one determined trajectory-influencing attribute and (2) each object-specific value is within the predetermined allowable value range associated with the corresponding changeable trajectory parameter, then update the trajectory plan by applying the same transformation to each waypoint of one or more of the at least one group of waypoints of the selected predetermined, parameterized trajectory, wherein the transformation is defined by the object-specific values for the one or more predetermined trajectory-influencing attributes; and
execute the task based on the updated trajectory plan.

9. The robotic system of claim 8, wherein the at least one group of waypoints are a subset of a series of waypoints in a three-dimensional (3D) space in the environment associated with the robotic system.

10. The robotic system of claim 9, wherein updating the trajectory plan based on the object-specific values for the one or more predetermined trajectory-influencing attributes comprises one or more of: scaling the subset of waypoints, rotating the subset of waypoints, or moving the subset of waypoints.

11. The robotic system of claim 8, wherein the one or more objects are identified based on sensor data captured by one or more sensors associated with the robotic system.

12. The robotic system of claim 8, wherein one or more of the object-specific values are determined based on sensor data captured by one or more sensors associated with the robotic system.

13. The robotic system of claim 8, wherein the processors are further configured to execute the instructions to:
access a scene database comprising a plurality of data entries, wherein each data entry comprises an object identifier (ID), an object type associated with the object ID, and the one or more predetermined trajectory-influencing attributes associated with that object type.

14. The robotic system of claim 13, wherein determining, for each of the one or more objects and based on the respective identified object type, one or more predetermined trajectory-influencing attributes of the respective identified object type comprises:

comparing the one or more objects with the plurality of data entries in the scene database to identify one or more object IDs matching one or more of the one or more objects; and retrieving, from the scene database, the one or more predetermined trajectory-influencing attributes corresponding to the identified one or more object IDs.

15. A computer-readable non-transitory storage media comprising instructions executable by a processor to:

access a natural-language input regarding a task to be executed by the robotic system;

determine a semantic meaning of the natural-language input to identify, from the natural-language input, (1) the task and (2) one or more objects for the robotic system to use to complete the task;

generate, for the task to be executed by the robotic system, a trajectory plan to complete the task by selecting a predetermined, parameterized trajectory based on the identified task, wherein the parameterized trajectory comprises at least one group of waypoints for which modifications apply collectively to the waypoints in the group, and wherein the parameterized trajectory is associated with one or more changeable trajectory parameters, each changeable trajectory parameter associated with a predetermined allowable value range;

identify one or more objects in an environment of the robotic system that correspond to the one or more objects identified from the natural-language input to use for completing the task;

identify, for each of the one or more objects, an object type from a set of a plurality of predetermined object types, wherein each object type is distinct from a shape;

determine, for each of the one or more objects and based on the respective identified object type, one or more predetermined trajectory-influencing attributes of the respective identified object type, wherein the one or more predetermined trajectory-influencing attributes comprises one or more of an object size, an object shape, an object color, an object texture, and an object orientation;

determine, for each of the one or more objects, whether each of the changeable trajectory parameters corresponds to at least one determined trajectory-influencing attribute;

determine, for each of the one or more objects, a respective object-specific value for each of the one or more predetermined trajectory-influencing attributes;

determine, for each of the one or more objects, whether each object-specific value is within the predetermined allowable value range associated with the corresponding changeable trajectory parameter;

in response to a determination that (1) each changeable trajectory parameter corresponds to at least on determined trajectory-influencing attribute and (2) each object-specific value is within the predetermined allowable value range associated with the corresponding changeable trajectory parameter, then update the trajectory plan by applying the same transformation to each waypoint of one or more of the at least one group of waypoints of the selected predetermined, parameterized trajectory, wherein the transformation is defined by the object-specific values for the one or more predetermined trajectory-influencing attributes; and execute the task based on the updated trajectory plan.

16. The media of claim 15, wherein the at least one group of waypoints are a subset of a series of waypoints in a three-dimensional (3D) space in the environment associated with the robotic system.

17. The media of claim 16, updating the trajectory plan based on the object-specific values for the one or more predetermined trajectory-influencing attributes comprises one or more of: scaling the subset of waypoints, rotating the subset of waypoints, or moving the subset of waypoints.

18. The media of claim 15, wherein the one or more objects are identified based on sensor data captured by one or more sensors associated with the robotic system.

19. The media of claim 15, wherein one or more of the object-specific values are determined based on sensor data captured by one or more sensors associated with the robotic system.

20. The media of claim 15, wherein the instructions are further executable by the processor to:

access a scene database comprising a plurality of data entries, wherein each data entry comprises an object identifier (ID), an object type associated with the object ID, and the one or more predetermined trajectory-influencing attributes associated with that object type.

* * * * *